United States Patent
Shimizu et al.

(10) Patent No.: US 9,354,088 B2
(45) Date of Patent: *May 31, 2016

(54) ROTATION ANGLE MEASUREMENT DEVICE AND ROTATION ANGLE MEASUREMENT METHOD

(71) Applicant: Tokyo Seimitsu Co., Ltd., Hachioji-Shi, Tokyo (JP)

(72) Inventors: Toru Shimizu, Tsuchiura (JP); Nobuyuki Osawa, Tsuchiura (JP); Takashi Fujita, Hachioji (JP)

(73) Assignee: Tokyo Seimitsu Co., Ltd., Hachioji-Shi, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/379,055

(22) PCT Filed: Feb. 12, 2013

(86) PCT No.: PCT/JP2013/053215
§ 371 (c)(1),
(2) Date: Aug. 15, 2014

(87) PCT Pub. No.: WO2013/122037
PCT Pub. Date: Aug. 22, 2013

(65) Prior Publication Data
US 2015/0036144 A1   Feb. 5, 2015

(30) Foreign Application Priority Data

Feb. 15, 2012  (JP) ................................. 2012-030828
Nov. 7, 2012  (JP) ................................. 2012-245265

(51) Int. Cl.
*G01B 11/02*  (2006.01)
*G01D 5/347*  (2006.01)
*G01D 5/26*  (2006.01)

(52) U.S. Cl.
CPC .............. *G01D 5/3473* (2013.01); *G01D 5/266* (2013.01)

(58) Field of Classification Search
CPC . G01D 5/266; G01D 5/3473; G01D 5/34738; G01B 11/26
USPC ......................................................... 356/498
See application file for complete search history.

(56) References Cited

U.S. PATENT DOCUMENTS

| | | | |
|---|---|---|---|
| 4,044,610 A | 8/1977 | Oldaeus et al. | |
| 5,237,390 A | 8/1993 | Chaney | |

(Continued)

FOREIGN PATENT DOCUMENTS

| | | |
|---|---|---|
| DE | 2605139 A1 | 9/1976 |
| EP | 2447677 A2 | 5/2012 |

(Continued)

OTHER PUBLICATIONS

Oct. 27, 2014—Notification of Reasons for Rejection—App 2013-558688—partial English Translation.

(Continued)

*Primary Examiner* — Jonathan Hansen
(74) *Attorney, Agent, or Firm* — Banner & Witcoff, Ltd.

(57) ABSTRACT

A rotation angle measurement device includes: relative angle detection means including a reference support whose rotation is regulated in a fixed range in an arbitrary direction of a rotation axis, and a driving rotating body which is coupled to the reference support and is axially supported so as to be all-round rotatable with respect to the reference support, the relative angle detection means which detects a relative rotation angle of the rotating body with respect to the reference support; and non-contact angle detection means which detects a rotation angle of the reference support with reference to a position that does not contact with the rotating body and the reference support. This provides improved accuracy in indexing the rotation angle of a rotating moving shaft and easy installation onto the rotating moving shaft.

16 Claims, 15 Drawing Sheets

(56) References Cited

U.S. PATENT DOCUMENTS

| | | | |
|---|---|---|---|
| 5,341,702 | A | 8/1994 | Chaney et al. |
| 5,508,806 | A | 4/1996 | Dowdy et al. |
| 5,969,817 | A | 10/1999 | Ohsawa |
| 6,008,901 | A | 12/1999 | Ohtsuka |
| 2008/0148808 | A1 | 6/2008 | Vasiloiu |
| 2008/0149816 | A1* | 6/2008 | Wang et al. .............. 250/231.18 |

FOREIGN PATENT DOCUMENTS

| | | |
|---|---|---|
| JP | 02-272310 | 11/1990 |
| JP | H03-128815 U | 12/1991 |
| JP | H05-500864 A | 2/1993 |
| JP | H06-502727 A | 3/1994 |
| JP | H09-005080 A | 1/1997 |
| JP | 09-243336 | 9/1997 |
| JP | 10-118894 | 5/1998 |
| JP | 11-132752 A | 5/1999 |
| JP | 2000-275030 A | 10/2000 |
| JP | 2005-292037 A | 10/2005 |
| JP | 2006-047093 A | 2/2006 |
| JP | 2007-333712 A | 12/2007 |
| JP | 2008-145299 A | 6/2008 |
| JP | 2012-093252 A | 5/2012 |
| JP | 2013-079978 A | 5/2013 |
| NL | 1033040 C2 | 6/2008 |
| WO | 9119958 A1 | 12/1991 |
| WO | 9305360 A1 | 3/1993 |

OTHER PUBLICATIONS

May 13, 2014—(JP) International Preliminary Report on Patentability—Int'l App PCT/JP2013/053215.
Aug. 15, 2014—(JP) International Preliminary Report on Patentability—Int'l App PCT/JP2013/053215.
Cui et. al., "Development of Measuring Method for Positioning Accuracy of Tilting Axes in Five-axis Machining Center—Development of Clinometer using a Rotary Encoder and a Level"—Journal of JSPE vol. 73 No. 9, Sep. 5, 2007, p. 1040-1045.
International Search Report issued in corresponding International Application No. PCT/JP2013/053215, mailed Apr. 2, 2013.
Jul. 20, 2012—(JP) Explanation of Circumstances Concerning Accelerated Examination—App 2010-241173.
Aug. 7, 2012—(JP) Notification of Reasons for Rejection—App 2010-241173.
Oct. 19, 2012—(JP) Explanation of Circumstances Concerning Accelerated Examination—App 2012-230847.
Nov. 12, 2012—(JP) Notification of Reasons for Rejection—App 2012-230847.
Jan. 25, 2013—(JP) Explanation of Circumstances Concerning Accelerated Examination—App 2013-010062.
Mar. 8, 2013—(JP) Explanation of Circumstances Concerning Accelerated Examination—App 2013-044319.
Apr. 1, 2013—(JP) Notification of Reasons for Rejection—App 2013-044319.
May 29, 2013—(JP) Notification of Reasons for Rejection—App 2013-044319.
Jul. 25, 2013—(JP) Decision of Refusal—App 2013-044319.
Apr. 25, 2014—(EP) Extended Search Report—App 11186603.4.
Dec. 5, 2014—(US) Non-Final Office Action—U.S. Appl. No. 13/856,061.
Jul. 3, 2015—(EP) Office Action—App 15152832.0.
Jun. 29, 2015 (EP) Search Report—App 15152832.0.
Jul. 15, 2015—(EP) Search Report—App 15156327.7.
Aug. 13, 2015—(EP) Office Action—App 11186603.4.

* cited by examiner

ROTATION ANGLE MEASUREMENT DEVICE AND ROTATION ANGLE MEASUREMENT METHOD

TECHNICAL FIELD

The present invention relates to a rotation angle measurement device and a rotation angle measurement method, and particularly to a rotation angle measurement device and a rotation angle measurement method capable of improving the accuracy of indexing the rotation angle of a rotating moving shaft of a machine tool.

BACKGROUND ART

It is conventionally known that a method for measuring the rotation angle of a rotating moving shaft of a machine tool has steps including, for example, fastening a polygon mirror to the rotating moving shaft of the spindle of a lathe, the rotary table of a machining center or the like, indexing the rotating moving shaft every angle corresponding to a division angle of the polygon mirror, and measuring the deflection of light reflected from a reflection member that points in a fixed direction with an autocollimator or the like (hereinafter referred to as a "method using a polygon mirror").

In the method using a polygon mirror, measurable angles are determined by the division angle of the polygon mirror. For example, a 6-faceted mirror and an 8-faceted mirror permit measurement at every 60 degrees and every 45 degrees, respectively. To more minutely set the angle, the number of faces needs to be increased. This disadvantageously increases the cost of the polygon mirror, thus implementation is difficult. Such a method using a polygon mirror has a disadvantage in setting it minutely although the method offers relatively simple measurement.

To cope with the disadvantage, a method using a Hirth coupling is proposed, as is disclosed for example in PTL 1. This method includes the steps of rotating the rotating moving shaft of a machine tool fitted with a Hirth coupling by a predetermined unit angle each time, rotating the Hirth coupling backward by a unit angle each time after the Hirth coupling is disconnected, and repeatedly rotating the Hirth coupling in forward and reverse directions until the total of the rotation angles measured with a laser interferometer reaches a target displacement angle of the rotating moving shaft.

CITATION LIST

Patent Literature

{PTL 1}
Published Japanese Translation of PCT International Publication for Patent Application No. H06-502727

SUMMARY OF INVENTION

Technical Problem

However, the method using a Hirth coupling requires oscillating motions of repeatedly rotating the Hirth coupling in forward and reverse directions until the target displacement angle of the rotating moving shaft is reached, causing the overall measurement time to be prolonged. Since the accuracy of angular measurement depends on the resolution of gears of a Hirth coupling and Hirth coupling gears generate a transmission error at the time of repeating forward and reverse rotations, improvement in the measurement accuracy is limited.

To address such a disadvantage, a method using a rotary encoder can be taken as means for measuring the rotation angle of a rotating moving shaft of a machine tool. The rotary encoder includes a scale plate coaxially secured to an encoder shaft configured to be attached to the rotating moving shaft. The circumference of the scale plate is marked with graduations at equal angular intervals along the circumference direction. A graduation on the scale plate rotating together with the rotating moving shaft is read through optical or magnetic means. Rotation angle data according to the rotation angle is converted to an electric signal and output. This method means that the rotation angle of a rotating moving shaft can be measured with high accuracy by increasing the resolution of graduations of the scale plate. Moreover, oscillating motions as in the method using a Hirth coupling are not involved, thus enabling the overall measurement time to be shortened.

However, the method using a rotary encoder has technical disadvantages as follows.

When the rotation angle of a rotating moving shaft is measured with a rotary encoder, an inertial force associated with the start or stop of rotation of the rotating moving shaft can cause a very small amount of angle deviation. This is because the encoder body is rotated together with the rotating encoder shaft attached to the rotating moving shaft, resulting in a very small misalignment of the read position (where a read head is provided) on the scale plate. In this case, rotation angle data output from the rotary encoder contains an angle error (hereinafter referred to as an "initial offset error") resulting from the start or stop of rotation of the rotating moving shaft, causing decreased measurement accuracy.

Additionally, when measurement is performed with an axis misalignment (axial eccentricity) between the rotating moving shaft and the encoder shaft, the scale plate which co-rotates with the encoder shaft rotates about a position deviated from the center point. This causes rotation angle data output from the rotary encoder to contain angle errors (eccentric errors) due to the decentered encoder shaft throughout a range of 360 degrees, that is, one cycle of the rotating moving shaft, causing decreased measurement accuracy, for example as shown in FIG. 13.

Accordingly, in order to measure the rotation angle of a rotating moving shaft with a rotary encoder with high accuracy, the influence of the initial offset error must be removed and the encoder shaft must be precisely installed onto the rotating moving shaft so as not to cause an axial eccentricity. However, such installation work puts an enormous load on operators, leading to decreased working efficiency. For this reason, in practice, operators are compelled to install encoder shafts with some eccentric errors. When an encoder shaft is installed in this manner, rotation angle data output from the rotary encoder, as described above, contains an eccentric error, preventing high precision measurement.

Also, rotation angle data output from the rotary encoder contains not only eccentric errors generated throughout one cycle of the rotating moving shaft but also interpolation errors generated in a cycle shorter than that, as shown in the enlarged partial view at the lower row of FIG. 13. Factors responsible for the generation of such an interpolation error include a shape error in gear teeth for rotating the rotating moving shaft. More specifically, the rotating moving shaft has a gear for transferring a rotation driving force output from a motor and respective teeth of the gear have quite a few manufacturing errors in shape. This causes an interpolation error with a cycle of a rotation angle per tooth (rotational pitch). In the case of a gear composed of 360 teeth, the rotation angle per tooth (rotational pitch) is 1 degree, and an interpolation error occurs in a cycle corresponding to the rotational pitch. In addition, various factors can cause a local error. These errors cause decreased accuracy in indexing the rotation angle of a rotating moving shaft.

In view of the circumstances described above, the present invention aims to provide a rotation angle measurement device and a rotation angle measurement method which can improve the accuracy of indexing the rotation angle of a rotating moving shaft and allow easy installation onto the rotating moving shaft.

Solution to Problem

In order to achieve the above-mentioned object, a rotation angle measurement device according to the present invention includes: relative angle detection means including a reference support whose rotation is regulated in a fixed range in an arbitrary direction of a rotation axis, and a driving rotating body which is coupled to the reference support and is axially supported so as to be all-round rotatable with respect to the reference support, the relative angle detection means which detects a relative rotation angle of the rotating body with respect to the reference support; and non-contact angle detection means which detects a rotation angle of the reference support with reference to a position that does not contact with the rotating body and the reference support.

According to the present invention, even if the reference support rotates together with the rotating body when the relative rotation angle of the rotating body with respect to the reference support is detected by the relative angle detection means, the rotation angle of the rotating body can be accurately determined because the rotation angle of the rotating body is detected with reference to a position that does not contact with the rotating body and the reference support. Accordingly, accuracy in indexing the rotation angle of a rotating moving shaft is improved and easy installation onto the rotating moving shaft can be achieved.

It is preferable that the rotation angle measurement device according to the present invention include correction means which corrects the rotation angle detected by the relative angle detection means based on the rotation angle detected by the non-contact angle detection means.

According to the above-described mode, errors occurring associated with the rotation of the main body can be corrected.

It is preferable that in the rotation angle measurement device according to the present invention, the relative angle detection means detects the relative rotation angle of the rotating body every rotation angle smaller than a cycle of occurrence of a periodic error which periodically occurs associated with the rotation of the rotating body.

According to the above-described mode, periodic errors (e.g. interpolation errors) which periodically occurs associated with the rotation of the rotating body can be corrected.

It is preferable that in the rotation angle measurement device according to the present invention, the absolute angle detection means detect an absolute angle of the main body concurrently with the detection of the relative rotation angle by the relative angle detection means.

According to the above-described mode, errors occurring associated with the rotation of the reference support can be corrected more accurately without being affected by the rotating state of the rotating body because the non-contact angle detection means detects the rotation angle of the reference support concurrently with the detection of the relative rotation angle by the relative angle detection means.

It is preferable that in the rotation angle measurement device according to the present invention, the relative angle detection means be a rotary encoder.

According to the above-described mode, the rotation angle of the rotating body relative to the reference support can be determined with stability throughout the allowable range of rotation of the rotating body.

It is preferable that in the rotation angle measurement device according to the present invention, the non-contact angle detection means use laser interference.

According to the above-described mode, the absolute rotation angle of the reference support can be determined with sufficient accuracy.

In order to achieve the above-mentioned object, a rotation angle measurement method according to the present invention includes: a relative angle detection step for detecting a relative rotation angle between a reference support whose rotation is regulated in a fixed range in an arbitrary direction of a rotation axis, and a rotating body which is coupled to the reference support and is axially supported so as to be all-round rotatable with respect to the reference support; and a non-contact angle detection step for detecting a rotation angle of the reference support with reference to a position that does not contact with the rotating body and the reference support.

According to the present invention, even if the reference support rotates together with the rotating body when the rotation angle of the rotating body relative to the reference support is detected, the rotation angle of the rotating body can be accurately determined because the rotation angle of the rotating body is detected with reference to a position that does not contact with the rotating body and the reference support. Accordingly, accuracy in indexing the rotation angle of a rotating moving shaft is improved and easy installation onto the rotating moving shaft can be achieved.

It is preferable that the rotation angle measurement method according to the present invention include a correction step for correcting the rotation angle detected by the relative angle detection step based on the rotation angle detected by the non-contact angle detection step.

According to the above-described mode, errors occurring associated with the rotation of the main body can be corrected.

It is preferable that in the rotation angle measurement method according to the present invention, the relative angle detection step detect a relative rotation angle of the rotating body every rotation angle smaller than a cycle of the occurrence of a periodic error which periodically occurs associated with the rotation of the rotating body.

According to the above-described mode, periodic errors (e.g. interpolation errors) which periodically occurs associated with the rotation of the rotating body can be corrected.

It is preferable that in the rotation angle measurement method according to the present invention, the non-contact angle detection step detect the rotation angle of the reference support concurrently with the detection of the relative rotation angle by the relative angle detection step.

According to the above-described mode, errors occurring associated with the rotation of the reference support can be corrected more accurately without being affected by the rotating state of the rotating body because the non-contact angle detection means detects the rotation angle of the reference support concurrently with the detection of the relative rotation angle by the relative angle detection means.

Advantageous Effects of Invention

The present invention achieves improved accuracy in indexing the rotation angle of a rotating moving shaft and easy installation onto the rotating moving shaft.

DESCRIPTION OF EMBODIMENTS

First Embodiment of Invention

A first preferred embodiment according to the present invention will now be described with reference to the appended drawings.

Figure 1:
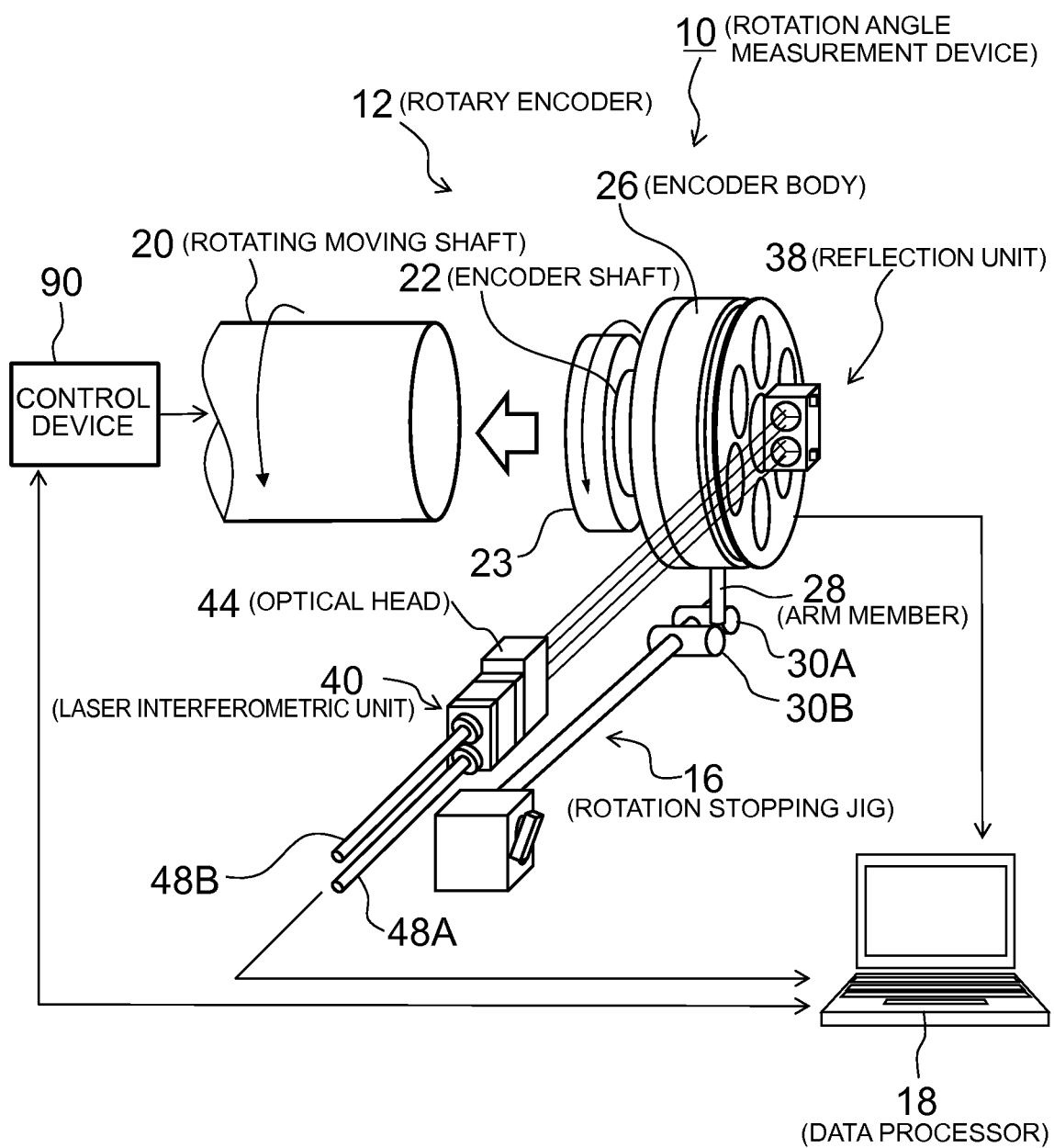
FIG. 1 is an overall configuration diagram of a rotation angle measurement device according to a first embodiment of the present invention.
Figure 2:
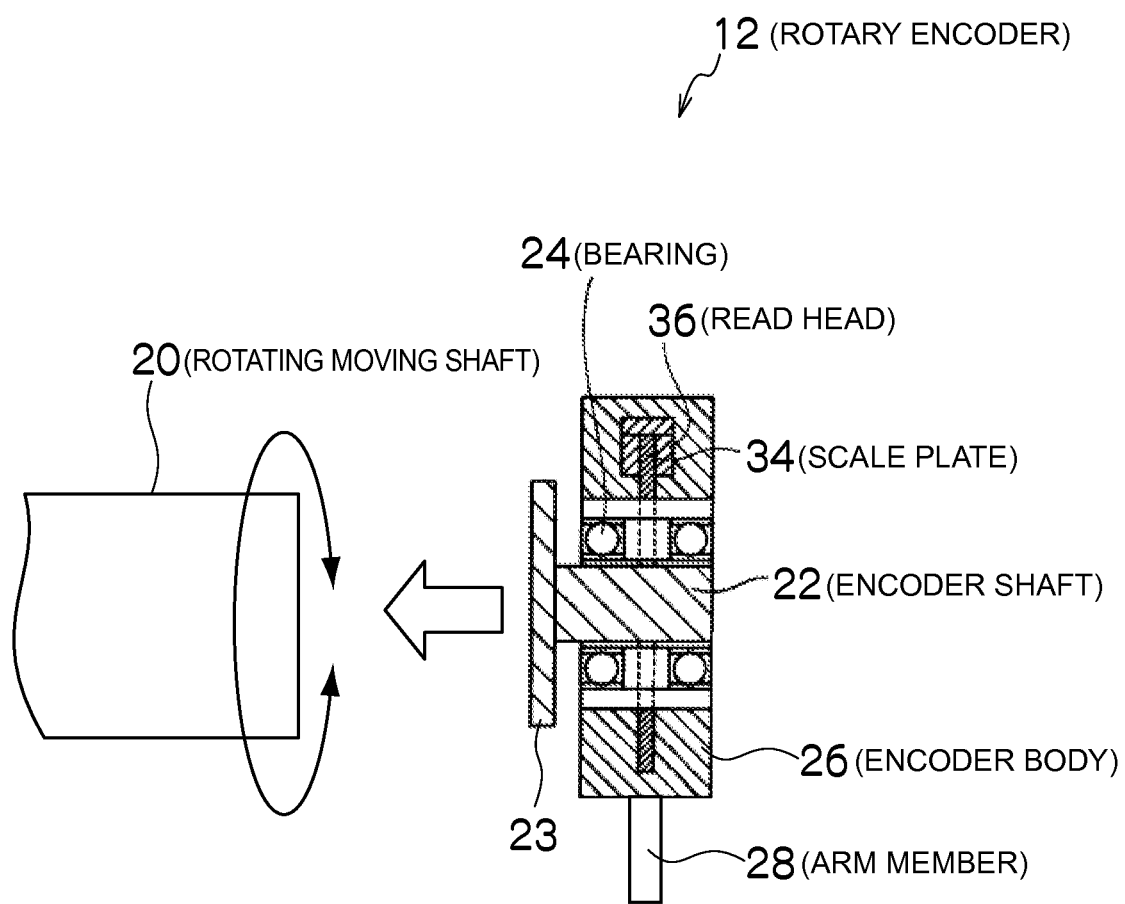
FIG. 2 is a cross-sectional diagram illustrating the configuration of a rotary encoder.

FIG. 1 is a schematic diagram illustrating an overall configuration of a rotation angle measurement device according to the first embodiment of the present invention. FIG. 2 is a cross-sectional diagram illustrating an internal structure of a rotary encoder.

With reference to FIG. 1, a rotation angle measurement device 10 mainly includes a rotary encoder 12 for measuring the rotation angle of a rotating moving shaft (a rotating shaft subject to detection) 20 of a machine tool, a reflection unit 38 arranged on the rotary encoder 12, a laser interferometric unit 40 secured to a section independent from the rotary encoder 12, and a data processor 18 that is connected to the rotary encoder 12 and the laser interferometric unit 40. The data processor 18 sends and receives various kinds of data to and from a control device 90 that controls the rotation of the rotating moving shaft 20.

With reference to FIGS. 1 and 2, the rotary encoder 12 mainly includes: an encoder shaft 22 that is coupled to the rotating moving shaft 20; and an encoder body 26 that rotatably supports the encoder shaft 22. The encoder body 26 is a reference support whose rotation is regulated in a fixed (predetermined) range in an arbitrary direction of a rotation axis. The encoder shaft 22 is coupled to the encoder body 26 acting as the reference support and is a rotating body which is supported all-round rotatably with respect to the encoder body 26.

The encoder shaft 22 has a large diameter part 23 at one end (the left end in FIG. 2), which is arranged outside the encoder body 26. The large diameter part 23 is a fitting for coupling the rotating moving shaft 20 to the encoder shaft 22. The rotating moving shaft 20 is secured to the large diameter part 23 by fixing means such as screws.

The encoder shaft 22 is rotatable with the aid of a bearing 24 provided in the encoder body 26. Thus, when the rotating moving shaft 20 rotates with the encoder shaft 22 coupled to itself, the encoder shaft 22 and the rotating moving shaft 20 rotate as an integral whole. The encoder body 26 is configured to be rotatable around the encoder shaft 22 and the allowable rotational range is regulated to a predetermined range by a rotation stopping jig 16, as described later.

As shown in FIG. 2, a scale plate 34 is coaxially secured to the encoder shaft 22. The scale plate 34 is arranged in the encoder body 26. The circumference of the scale plate 34 is marked with a plurality of graduations at predetermined angular intervals along the circumference direction. At an outer circumference of the scale plate 34, a U-shaped read head 36 is provided so as to sandwich the scale plate 34. The read head 36 includes a detection sensor for optically or magnetically reading a graduation on the scale plate 34, and outputs rotation angle data which shows the rotation angle (a rotational displacement) of the scale plate 34 to the data processor 18. The read head 36, which is secured inside the encoder body 26, rotates together with the encoder body 26 as an integral whole.

At an outer circumference of the encoder body 26, a rodlike arm member 28 that extends outward in a radial direction is provided. In other words, the arm member 28 is provided so as to protrude from the encoder body 26 in a direction perpendicular to the encoder shaft 22. The direction that the provided arm member 28 points, however, is not limited to a direction perpendicular to the encoder shaft 22 but may be a direction slanted at a specified angle. The arm member 28 is interposed between a pair of rotation regulating members 38A, 38B provided at an end of the rotation stopping jig 16 with a specified space between them, so that the allowable rotational range of the encoder body 26 is regulated to a predetermined range. The rotation stopping jig 16 is secured to a section separate from the encoder body 26.

Figure 3:
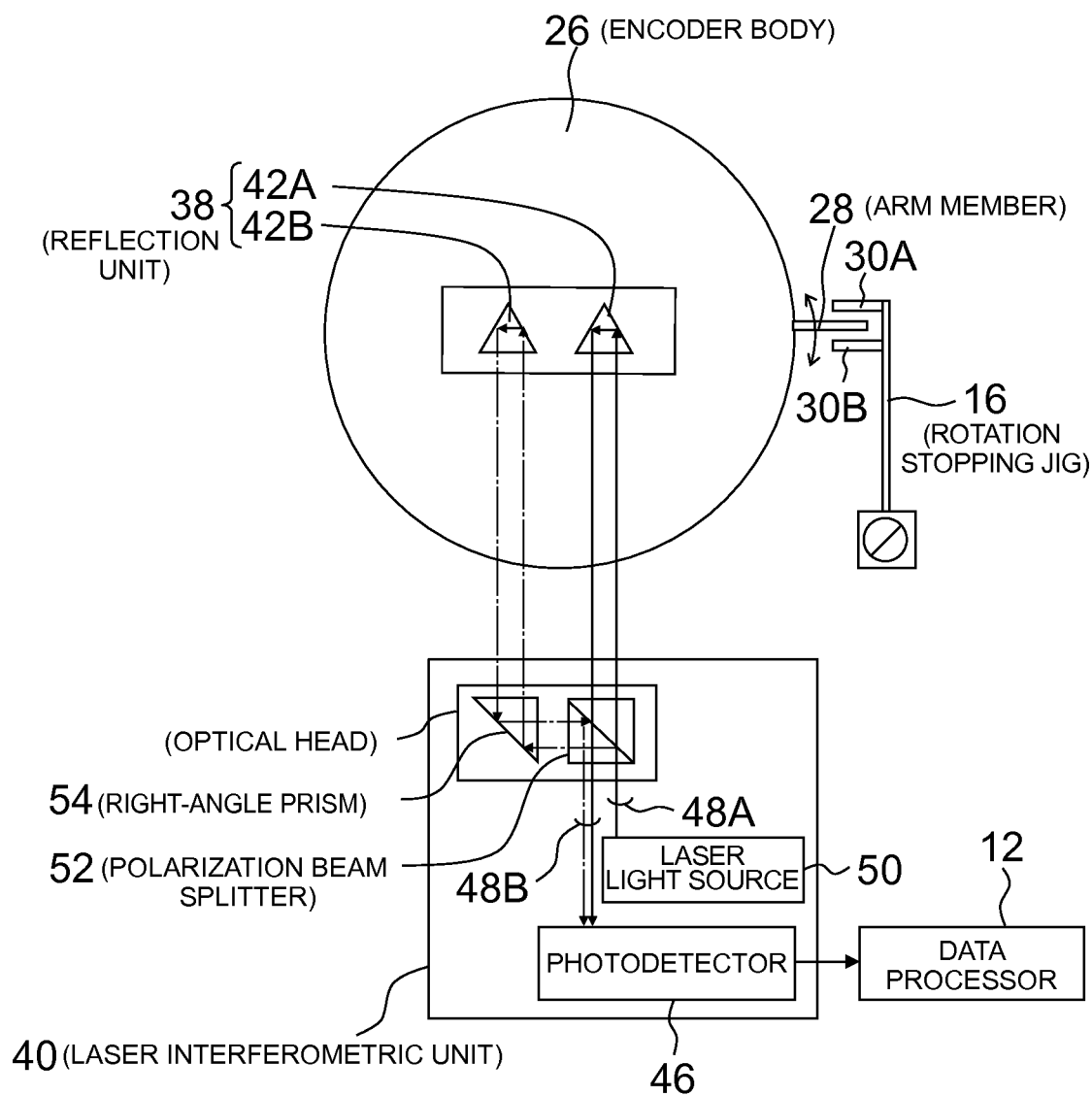
FIG. 3 is a schematic diagram illustrating a relationship between a reflection unit and a laser interferometric unit in arrangement.
Figure 4:
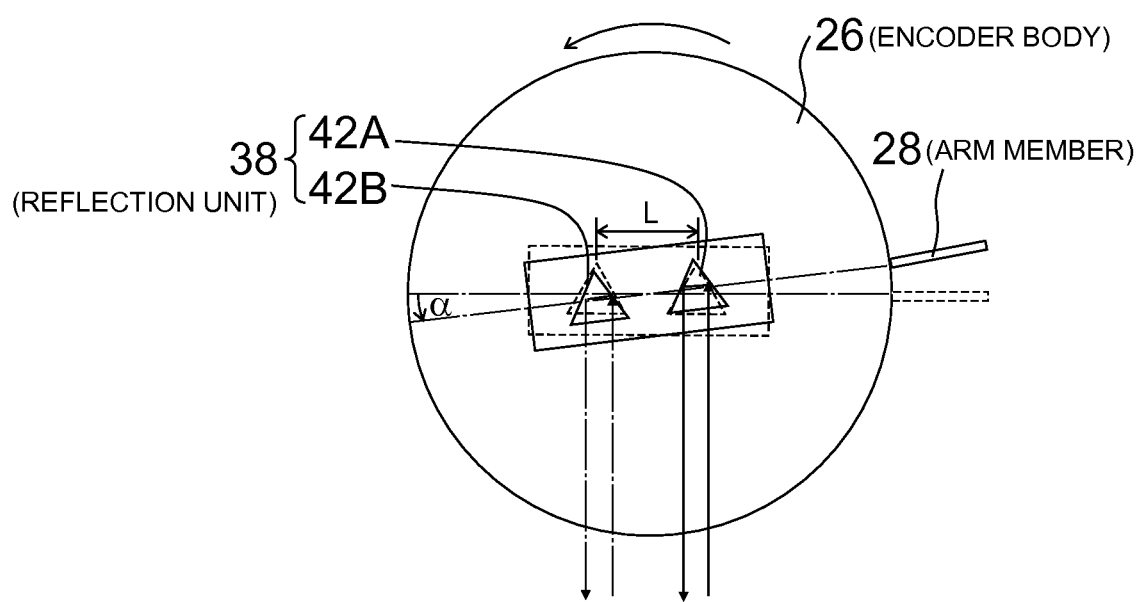
FIG. 4 is a schematic diagram illustrating a state where an encoder body rotates.

FIG. 3 is a schematic diagram illustrating a relationship between the reflection unit 38 and the laser interferometric unit 40 in arrangement. With reference to FIG. 3, the reflection unit 38 secured on the encoder body 26 has two corner cubes 42A, 42B arranged side by side. The corner cubes 42A, 42B are reflection members that reflect a first and a second laser beams, respectively, in a reverse direction, wherein the laser beams are projected in parallel from an optical head 44, in the laser interferometric unit 40 described later. The reflection unit 38 rotates together with the encoder body 26 as an integral whole. In other words, the rotation angles of the encoder body 26 and the reflection unit 38 are equal and, for example, as shown in FIG. 4, when the encoder body 26 rotates by α degrees counterclockwise (where α>0), the reflection unit 38 also rotates by α degrees counterclockwise.

With reference to FIG. 3, the laser interferometric unit 40 includes the optical head (interference head for angle measurement) 44 arranged at a position facing the reflection unit 38, a laser light source 50 connected via a first optical fiber 48A to the optical head 44, and a photodetector 46 connected via a second optical fiber 48B to the optical head 44. The laser interferometric unit 40 is non-contact angle detection means for detecting the rotation angle of the encoder body 26 with reference to a position out of contact with the encoder shaft 22 and the encoder body 26 taken as a reference.

It is preferable that a He—Ne laser light source excellent in wavelength stability is used for the laser light source 50. Other laser light sources, however, can be used because measurement accuracy is not greatly affected even if wavelength stability is not ensured.

The optical head 44 includes a polarization beam splitter 52 and a right-angle prism 54 which are arranged adjacent to each other. A laser beam emitted from the laser light source 50 enters the optical head 44 via the first optical fiber 48A and then first enters the polarization beam splitter 52 where the laser beam is split into two laser beams. One of the split laser beams (a first laser beam) enters the first corner cube 42A and returns in the reverse direction and again enters the polarization beam splitter 52. The other of the split laser beams (a second laser beam) is reflected off the right-angle prism 54 and travels in a direction parallel to the optical axis of the first laser beam to enter the second corner cube 42B and returns in the opposite direction. Then, the second laser beam is again reflected off the right-angle prism 54 and the polarization beam splitter 52 and interferes with the beam reflected off the first corner cube 42A. The laser beam which has undergone interference (interference light) is output to the photodetector 46 via the second optical fiber 48B.

Based on interference light output from the optical head 44, the photodetector 46 detects an optical path length difference (phase difference) between the returned beams (the first and the second laser beams) reflected off the respective corner cubes 42A, 42B and outputs optical path length difference data which shows the detected optical path length difference to the data processor 18. Although a detailed explanation about the principle of detecting an optical path length difference is omitted here because it is publicly known, when the rotation angle of the reflection unit 38 changes along with the infinitesimal rotational motion of the encoder body 26, there are changes in optical path length of the path where a beam is reflected off the first corner cube 42A and returns, and in the optical path length of the path where a beam is reflected off the second corner cube 42B and returns. At this time, the number of fringes in interference light changes. Thus, counting a change in the number of fringes in the interference light permits the determination of an optical path length difference between the first and the second laser beams.

For example, a fringe counting technique and a heterodyne technique by the use of a Michelson interferometer can be used for detecting an optical path length difference. In the case of a heterodyne technique, the laser light source 50 is required to present frequencies in two orthogonal directions. Thus, for example, a Zeeman laser or an AOM (acousto-optic modulator) is used.

Figure 5:
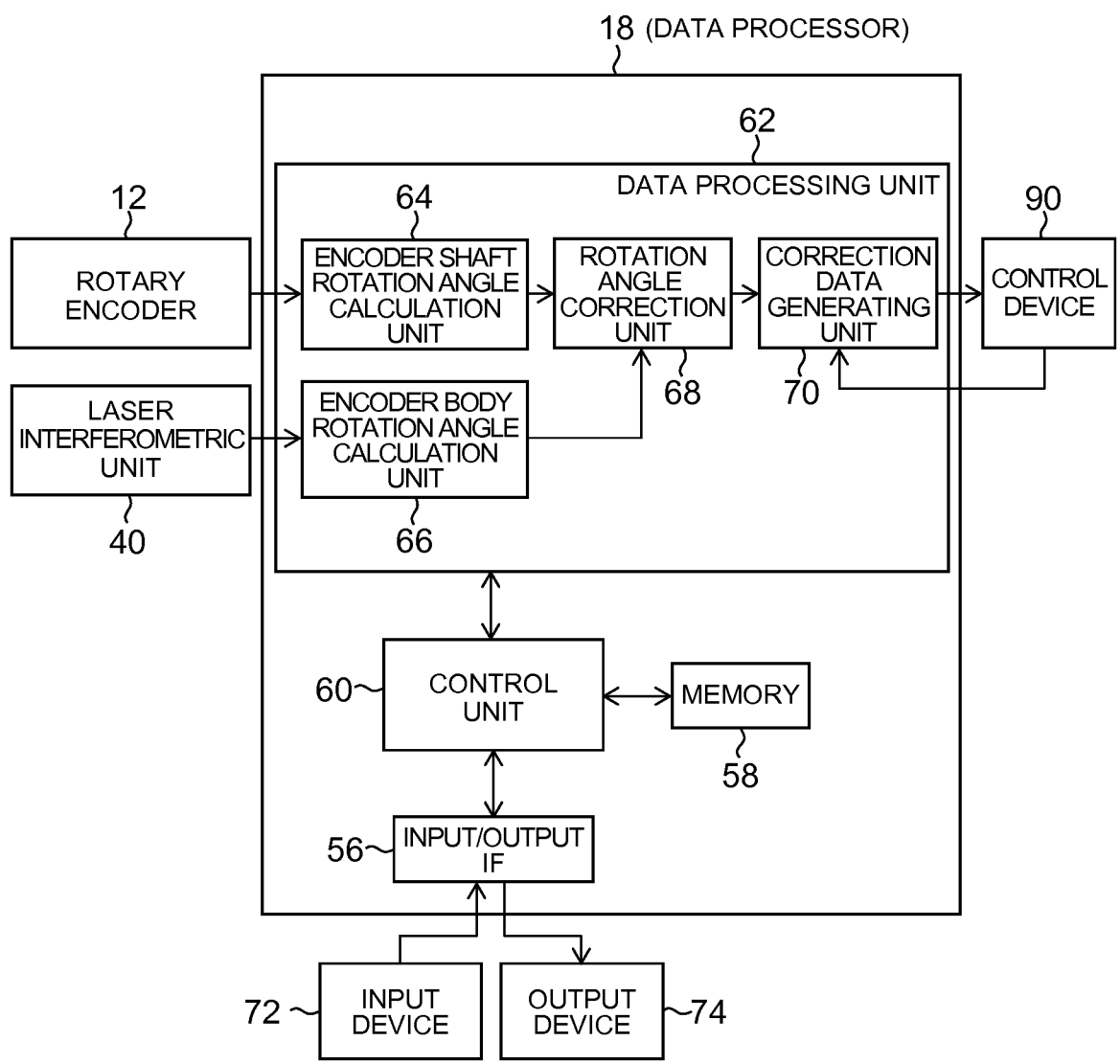
FIG. 5 is a block diagram illustrating a functional configuration of a data processor.

FIG. 5 is a block diagram illustrating a functional configuration of the data processor 18. With reference to FIG. 5, the data processor 18 includes an input/output IF 56, a memory 58, a control unit 60 and a data processing unit 62.

The input/output IF 56 is an interface for allowing the input and the output of data from an input device 72 and to an output device 74. The input device 72 includes a keyboard, a mouse and a touch panel used by an operator to perform input operation. The output device 74 includes a monitor and a printer used for displaying and outputting various kinds of information.

The memory 58, composed of a ROM, a RAM and the like, is a storage unit that stores programs and various data for operating all units of the data processor 18. The control unit 60 controls each unit of the data processor 18.

The data processing unit 62 generates correction data for the rotation angle of the rotating moving shaft 20 and includes an encoder shaft rotation angle calculation unit 64, an encoder body rotation angle calculation unit 66, a rotation angle correction unit 68 and a correction data generating unit 70.

The encoder shaft rotation angle calculation unit 64 receives rotation angle data output from the rotary encoder 12 (read head 36) and calculates a rotation angle θ1 of the encoder shaft 22 based on the received rotation angle data. The rotation angle θ1 calculated by the encoder shaft rotation angle calculation unit 64 is output to the rotation angle correction unit 68.

The encoder body rotation angle calculation unit 66 receives data on an optical path length difference output from the laser interferometric unit (photodetector 46) to calculate a rotation angle θ2 of the encoder body 26 based on the received data on the optical path length difference. The rotation angle θ2 calculated by the encoder body rotation angle calculation unit 66 is output to the rotation angle correction unit 68.

The rotation angle correction unit 68 corrects the rotation angle θ1 calculated by the encoder shaft rotation angle calculation unit 64 based on the rotation angle θ2 calculated by the encoder body rotation angle calculation unit 66. Specifically, the rotation angle θ1 is corrected by adding the rotation angle θ2 to the rotation angle θ1. A rotation angle (corrected rotation angle) θ1' which the rotation angle correction unit 68 has corrected is output to the correction data generating unit 70.

The correction data generating unit 70 generates correction data so as to cancel an error between the rotation angle of the rotating moving shaft 20 (a set angle) and an actual rotation angle (corrected rotation angle θ1') based on the corrected rotation angle θ1' output from the rotation angle correction unit 68. The correction data generated by the correction data generating unit 70 is output to the control device 90 of a machine tool or the output device 74.

The correction data generating unit 70 acquires from the control device 90 a conversion factor for converting correction data to a correction amount for the rotation angle and generates correction data based on the acquired conversion factor. For example, in the case of a correction amount of 1 degree for the rotation angle, the correction data generating unit 70 outputs 10 as correction data when the conversion factor acquired from the control device 90 is 0.1 and outputs 1 when the conversion factor is 1.

The principle of correcting a rotation angle according to the first embodiment will now be described.

Figure 6:
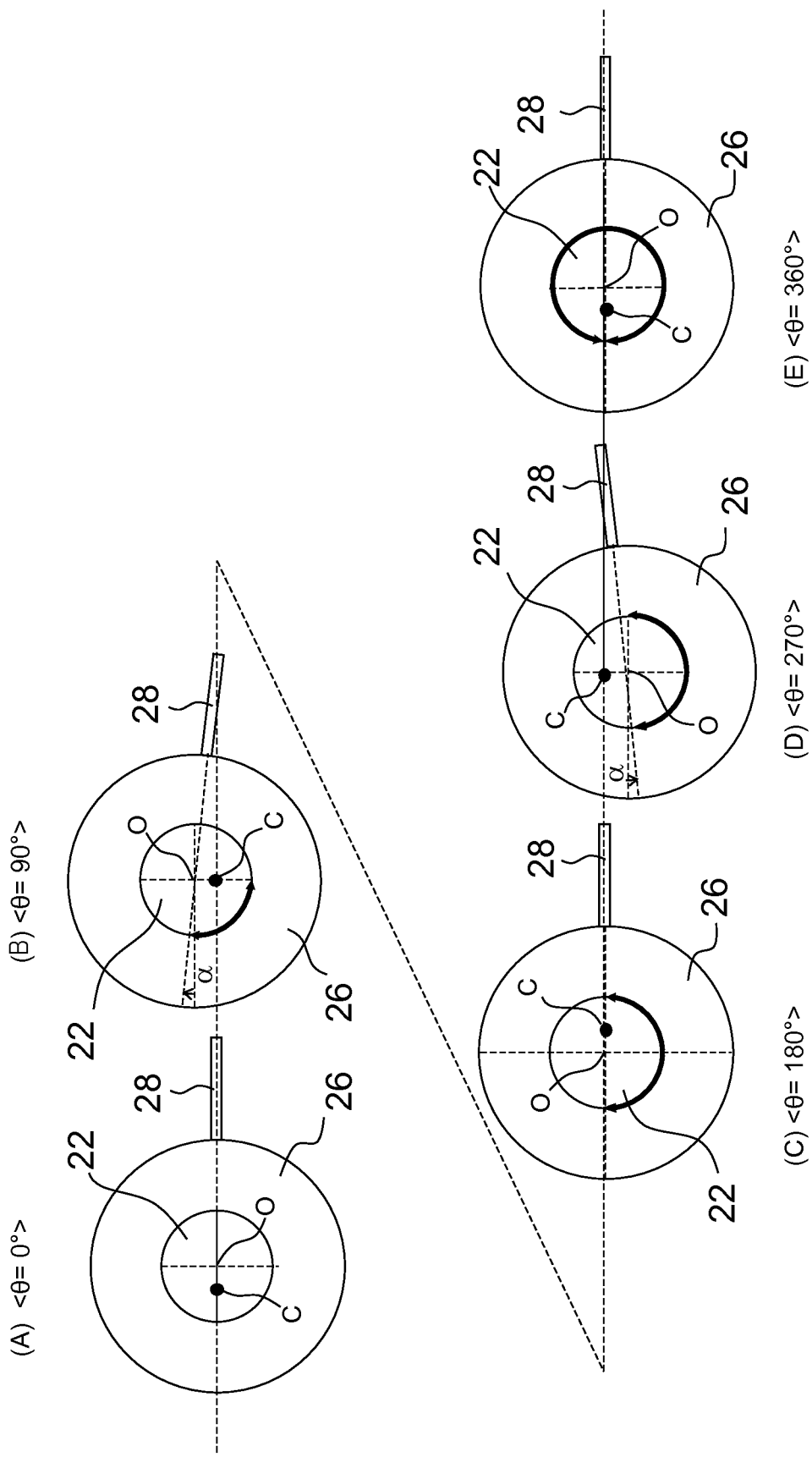
FIG. 6 is a schematic diagram of relative positions between an encoder shaft and an encoder body, wherein (A) shows an initial relative position, and (B) to (E) show relative positions when the rotation angle θ is 90, 180, 270 and 360 degrees, respectively.

FIG. 6 is a schematic diagram of a relative positional relationship between the encoder shaft 22 and the encoder body 26. As shown in FIG. 6, assume that the center of rotation C is placed at a position a specified distance apart from the center O of the encoder shaft 22. The center of rotation C coincides with the shaft center of the rotating moving shaft 20. Also, let the state (A) of FIG. 6 be an initial position and a rotation angle θ of the rotating moving shaft 20 at that moment be 0 degree. Assume that the rotation angle θ takes a positive value in a counterclockwise direction and a negative value in a clockwise direction opposed to that direction.

As shown in (B) of FIG. 6, when the rotating moving shaft 20 rotates by 90 degrees from the initial position, the center O of the encoder shaft 22 moves upward with respect to the center of rotation C. At this moment, as the pair of the rotation regulating members 38A, 38B of the rotation stopping jig 16 regulate the motion of the end portion of the arm member 28 (in an up-and-down direction in FIG. 6), the encoder body 26 rotates by an infinitesimal angle clockwise like a pendulum with the end portion as a center. Consequently, the encoder body 26 rotates about the center O by −α degrees. This causes the rotary encoder 12 (read head 36) to output rotation angle data that shows a rotation angle which is α degrees greater than the rotation angle by which the encoder shaft 22 actually has rotated, that is, (90+α) degrees.

Next, as shown in (C) of FIG. 6, when the rotating moving shaft 20 rotates by 180 degrees from the initial position, the center O of the encoder shaft 22 moves leftward with respect to the center of rotation C. With this movement, the encoder body 26 becomes a state the same as the initial position (the state (A) of FIG. 6). As a result, the rotary encoder 12 outputs a rotation angle by which the encoder shaft 22 actually has rotated, that is, rotation angle data which shows 180 degrees.

Next, as shown in (D) of FIG. 6, when the rotating moving shaft 20 rotates by 270 degrees from the initial position, the center O of the encoder shaft 22 moves downward with respect to the center of rotation C. With this movement, the encoder body 26 rotates by an infinitesimal angle counter-clockwise with the end portion of the arm member 28 as a center. Consequently, the encoder body 26 rotates about the center O by α degrees. This causes the rotary encoder 12 to output rotation angle data that shows a rotation angle which is α degrees smaller than the rotation angle by which the encoder shaft 22 actually has rotated, that is, (270−α) degrees.

Next, as shown in (E) of FIG. 6, when the rotating moving shaft 20 rotates by 360 degrees from the initial position, the encoder body 26 becomes a state the same as the initial position (the state (A) of FIG. 6). As a result, the rotary encoder 12 outputs a rotation angle by which the encoder shaft 22 actually has rotated, that is, rotation angle data which shows 360 degrees.

That is to say, in the first embodiment, when the encoder shaft 22 is coupled to the rotating moving shaft 20 with the axes misaligned, the encoder body 26 is configured to oscillate like a pendulum depending on the rotation angle of the encoder shaft 22 with the end portion of the arm member 28, i.e. a portion clamped (sandwiched) between the pair of the rotation regulating members 38A, 38B as a pivot (center), and to be rotatable about the encoder shaft 22 as much an angle equivalent to the eccentric error. This permits an eccentric error contained in rotation angle data output from the rotary encoder 12 to be determined based on the rotation angle of the encoder body 26. Thus, the influence of an eccentric error arising from the axis misalignment of the encoder shaft 22 can be canceled by correcting the rotation angle of the encoder shaft 22 based on the rotation angle of the encoder body 26, enabling the detection of the rotation angle of the encoder shaft 22 with improved accuracy.

Figure 7:
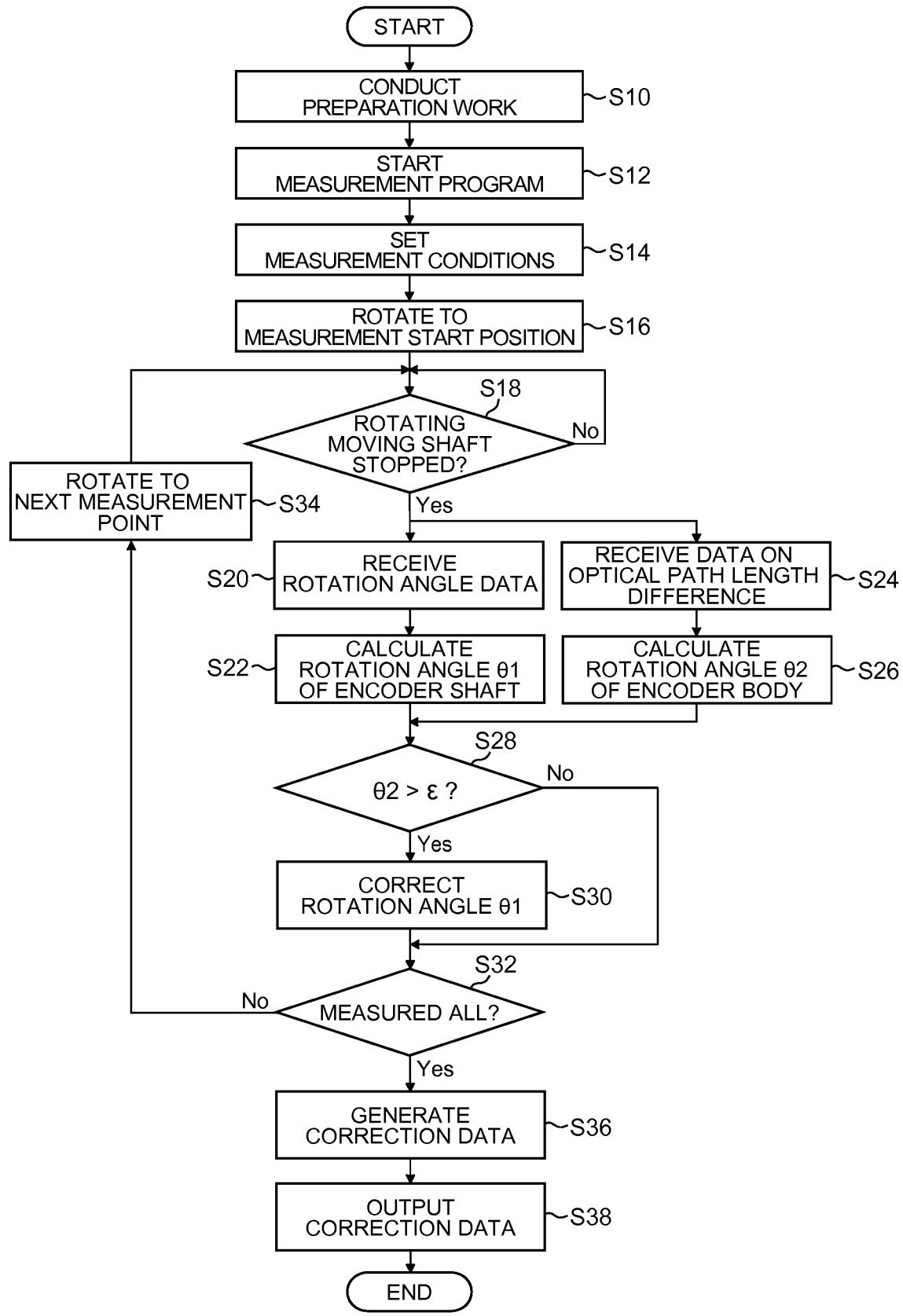
FIG. 7 is a flowchart showing an example of processes of a method for measuring rotation according to the first embodiment of the present invention.

A rotation angle measurement method by the use of the rotation angle measurement device 10 according to the first embodiment will now be described. FIG. 7 is a flowchart showing a method for measuring rotation angle according to the first embodiment.

In the beginning, conduct preparation work for measurement with the rotation angle measurement device 10 (step S10). Specifically, the encoder shaft 22 is coupled to the rotating moving shaft 20. Also, the reflection unit 38 is mounted on the encoder body 26 and the optical head 44 is fixed onto a position opposing the reflection unit 38. The laser light source 50 and the photodetector 46 are connected to the optical head 44 via the first and the second optical fibers 48A, 48B. The rotary encoder 12 and the laser interferometric unit 40 are connected to the data processor 18 via a cable (not shown). In addition, the arm member 28 that protrudes from the periphery of the encoder body 26 is interposed between the pair of the rotation regulating members 38A, 38B of the rotation stopping jig 16.

Next, the power of the data processor 18 is turned on to run a program for measuring rotation angles (step S12). At that time, also the power of each unit other than the data processor 18 is turned on so as to get ready to start measurement.

Next, conditions for measuring rotation angles are set (step S14). Specifically, a measurement start position, a measurement end position, measurement intervals and a data acquisition method are set as measurement conditions for rotation angles. For example, when the measurement start position, the measurement end position, and the measurement intervals are set to 0 degree, 360 degrees and 45 degrees, respectively, measurement positions are 9 measurement points placed 45-degree intervals over one cycle of the rotating moving shaft 20, that is, a range of 360 degrees. Alternatively, the number of measurement points may be input instead of measurement intervals, or rotation angles designating respective measurement points may be directly input. The data acquisition method includes the number of measurement times at each measurement point and a sequence of traveling between measurement points (selecting a direction from the measurement start position up to the measurement end position and repetition method). These measurement conditions are input from the input device 72 connected to the data processor 18.

Next, the rotating moving shaft 20 is rotated up to a position where measurement starts (step S16). After that, it is determined whether or not the rotating moving shaft 20 has been stopped (step S18), and the system enters a standby state until it is determined that the rotating moving shaft 20 has been stopped. When it is determined that the rotating moving shaft 20 has been stopped, the process advances to the next steps S20 and S24.

After the rotating moving shaft 20 comes to a stop, the encoder shaft rotation angle calculation unit 64 receives rotation angle data output from the rotary encoder 12 (step S20) and calculates the rotation angle θ1 of the encoder shaft 22 based on the received rotation angle data (step S22).

Concurrently with each processing in the steps S20 and S22, the encoder body rotation angle calculation unit 66 receives data on an optical path length difference output from the photodetector 46 (step S24) and calculates the rotation angle θ2 of the encoder body 26 based on the received data on the optical path length difference (step S26).

At this time, the rotation angle θ2 of the encoder body 26 is calculated by the following equation (1), wherein L represents an interval between the two corner cubes 42A, 42B (distance between centers) as shown in FIG. 4; and x is an optical path length difference detected by the laser interferometric unit 40 (photodetector 46).

$$\theta 2 = \sin^{-1}(x/2L) \qquad (1)$$

Note that the following equation (2) may be used because the optical path length difference x is small enough as compared to 2 L.

$$\theta 2 \approx x/2L \quad (2)$$

Next, the rotation angle correction unit 68 determines whether or not the rotation angle θ2 of the encoder body 26 is greater than a thresholds ε (step S28). If the rotation angle θ2 of the encoder body 26 is greater than the threshold ε, the rotation angle correction unit 68 corrects the rotation angle θ1 of the encoder shaft 22 calculated in the step S22 based on the rotation angle θ2 of the encoder body 26 calculated in the step S26 (step S30). Specifically, the rotation angle correction unit 68 adds the rotation angle θ2 of the encoder body 26 to the rotation angle θ1 of the encoder shaft 22 so as to calculate the corrected rotation angle θ1' in which an eccentric error arising from the axis misalignment of the encoder shaft 22 is removed, and takes the corrected rotation angle θ1' as an index angle at the current measurement point (measurement position) to advance to the next step S32.

On the other hand, if the rotation angle θ2 of the encoder body 26 is smaller than or equal to the threshold ε, the rotation angle correction unit 68 takes the rotation angle θ1 of the encoder shaft 22 as an index angle at the current measurement point without correcting the rotation angle θ1, and the process advances to the next step S32.

Embodiments are not limited to the method shown in FIG. 7 in which provision of correction for the rotation angle θ1 of the encoder shaft 22 depends on the size of the rotation angle θ2 of the encoder body 26. Correction can be made to the rotation angle of the encoder shaft 22 at all measurement points regardless of the size of the rotation angle θ2 of the encoder body 26. Nevertheless, the method shown in FIG. 7 enables the simplification of processing involved in the measurement of accuracy in indexing rotation angles because the rotation angle θ1 of the encoder shaft 22 that needs to be corrected is not necessarily at all measurement points in contrast to other modes where the rotation angle θ1 of the encoder shaft 22 is corrected at all measurement points. Especially in cases where the rotation angle θ2 of the encoder body 26 is sufficiently small in an overall measurement range and can be ignored, correction for the rotation angle θ1 of the encoder shaft 22 is not needed at all measurement points. Thus, the rotation angle θ1 of the encoder shaft 22 at each measurement point can be used as an index angle as-is.

Next, it is determined whether or not measurement is conducted at every measurement point each specified number of times (step S32). If measurement at each measurement point each specified number of times is not conducted, the rotating moving shaft 20 is rotated up to the next measurement point according to the data acquisition conditions set in the step S14 (step S34). Then, the processing in the step S18 and the subsequent steps are repeated until measurement is conducted at every measurement point each specified number of times. When it is determined in the step S32 that measurement is conducted at every measurement point each specified number of times, the process advances to the next step S36.

Next, the correction data generating unit 70 calculates an error between the rotation angle (set angle) and the index angle (i.e. corrected rotation angle θ1' calculated in the step S30) at each measurement point, generates correction data which represents a correction amount for the rotation angle so as to cancel the error (step S36), and outputs the correction data to the control device 90 of the machine tool or the output device 74 (step S38).

According to the first embodiment as described above, an absolute angle of rotation of the encoder body 26 around the encoder shaft 22 is detected and a rotation angle detected by the rotary encoder 12 is corrected based on the detected rotation angle of the encoder body 26, even if the encoder shaft 22 is coupled to the rotating moving shaft 20 with the axes misaligned. This enables the removal of an eccentric error contained in the rotation angle detected by the rotary encoder 12, that is, the rotation angle of the encoder shaft 22.

Particularly, since the first embodiment uses the laser interferometric unit 40 to detect the rotation angle of the encoder body 26, the infinitesimal rotation angle of the encoder body 26 can be detected with high accuracy even if the misalignment of the encoder shaft 22 relative to the rotating moving shaft 20 is a very small quantity. Thus, an eccentric error contained in the rotation angle of the encoder shaft 22 can be securely removed. This consequently leads to improved accuracy in indexing the rotation angle of the rotating moving shaft 20.

In addition, even if the encoder shaft 22 is installed with the axis misaligned, the first embodiment permits the removal of influences produced by an eccentric error. This allows the expansion of a permissible amount of eccentricity (maximum amount of eccentricity) for the encoder shaft 22 relative to the rotating moving shaft 20 as compared with that in the case of measurement by the use of a rotary encoder alone. This results in easy installation of the rotary encoder 12, substantially lightened load on operators and improved work efficiency.

Moreover, it is preferable that the rotatable range for the encoder body 26 according to the first embodiment be restricted to a range (e.g. about ±10 degrees) which allows the detection of the rotation angle of the encoder body 26 with sufficient accuracy through the use of the laser interferometric unit 40. The rotatable range for the encoder body 26 can be changed by adjusting the space between the pair of the rotation regulating members 38A, 38B provided on the rotation stopping jig 16. This enables the rotation angle of the encoder body 26 to be detected with high accuracy and thus an eccentric error to be securely removed.

Furthermore, according to the first embodiment, when an inertial force associated with the start or stop of rotation of the rotating moving shaft 20 causes the encoder body 26 to rotate together with the rotating encoder shaft 22, and consequently generates an infinitesimal angle deviation (hereinafter referred to as an "initial offset error") in the rotation angle detected by the rotary encoder 12, making the above-mentioned corrections allow the cancellation of influences produced by the eccentric error and the initial offset error at the same time.

Means for detecting the absolute rotation angle of the encoder body 26 is not limited to the laser interferometric unit 40 used in the first embodiment, but various methods (e.g. a level, an autocollimator and the like) may be appropriately adopted in response to the size (order) of an error subject to correction. It is, however, preferable that a mode like the first embodiment which uses the laser interferometric unit 40 to detect the rotation angle of the encoder body 26 be used. The preferable mode enables improved accuracy in indexing the rotation angle of the rotating moving shaft 20 without being affected by influences of an eccentric error and an initial offset error.

Second Embodiment of Invention

A second embodiment according to the present invention will now be described. Descriptions of elements that are shared with the above-mentioned embodiment are omitted and only elements characterized by the second embodiment will be mainly described.

Figure 8:
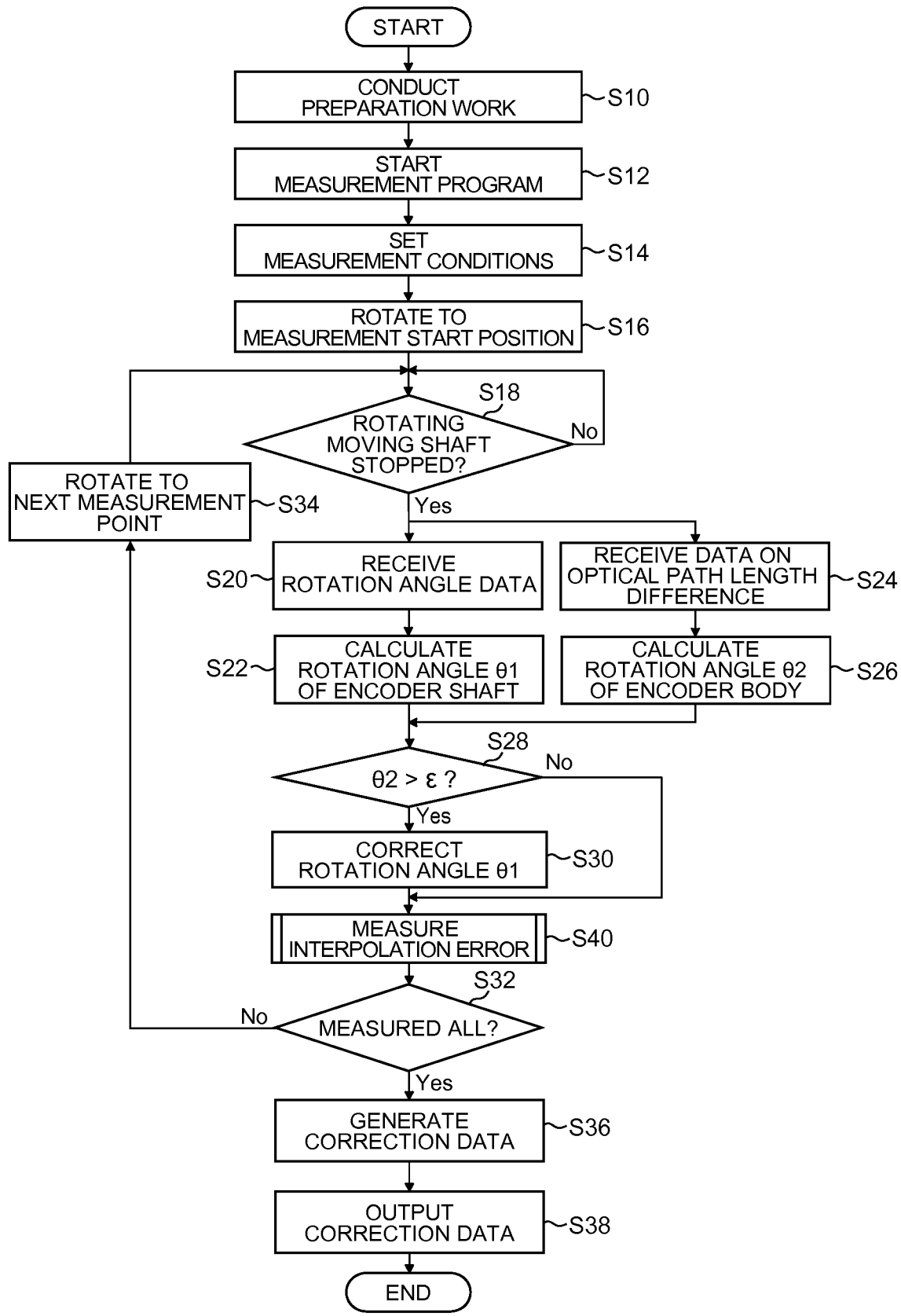
FIG. 8 is a flowchart showing an example of processes of a method for measuring rotation according to a second embodiment of the present invention.

FIG. 8 is a flowchart showing a method for measuring rotation angles according to the second embodiment of the present invention. In FIG. 8, steps identical to those of FIG. 7 are assigned with the same reference numerals, and their descriptions are omitted. Steps shown in the flowchart of FIG. 8 are performed using the rotation angle measurement device 10 presented in the first embodiment of the present invention.

In the second embodiment, as shown in FIG. 8, the rotation angle θ1 of the encoder shaft 22 calculated in the step S22 is corrected depending on the size of the rotation angle θ2 of the encoder body 26 calculated in the step S26 (steps S28, S30). After that, interpolation error measurement is performed on the vicinity of the current measurement point (step S40).

Figure 9:
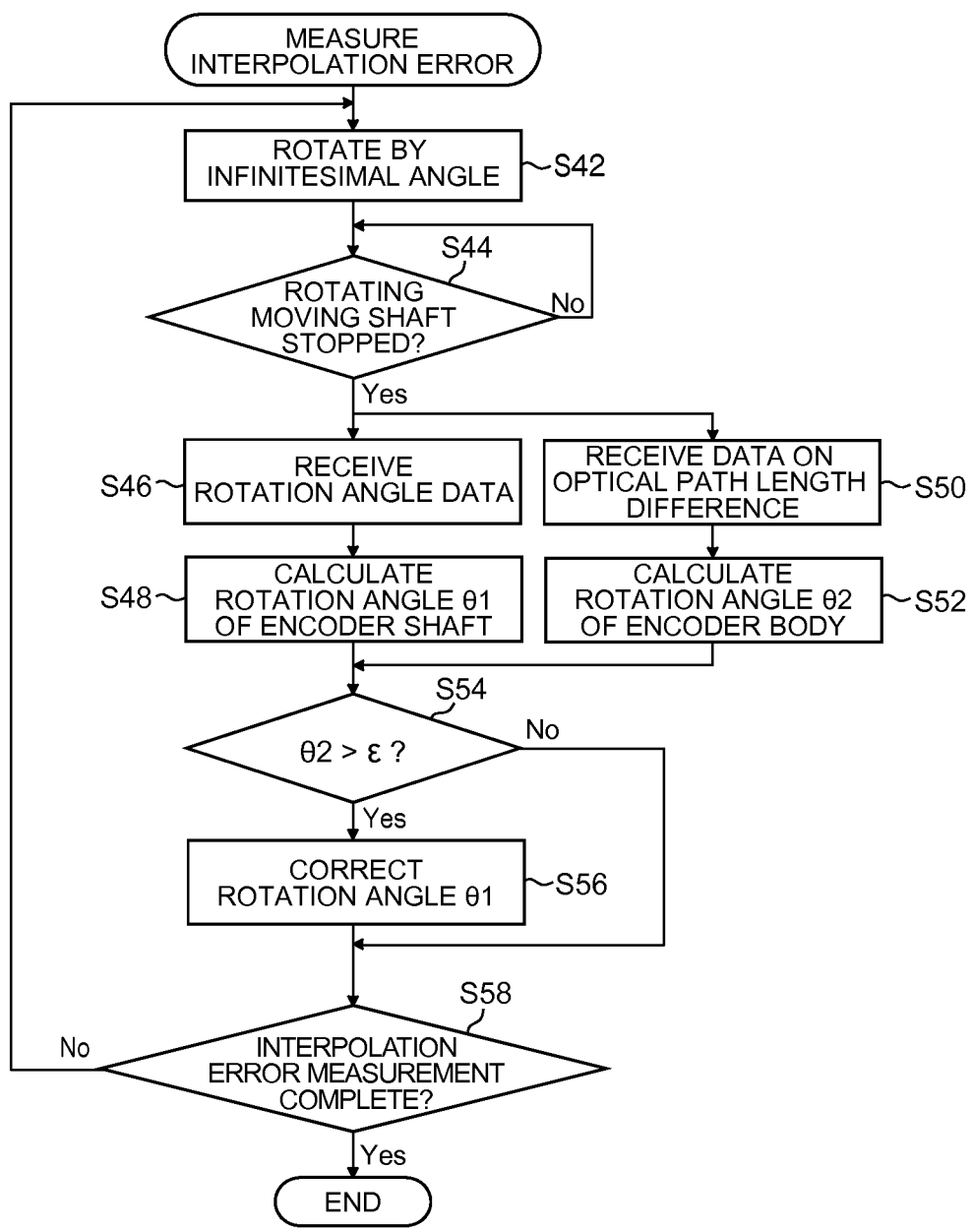
FIG. 9 is a flowchart showing a process for measuring an interpolation error.

Interpolation error measurement performed in the step S40 will now be described. FIG. 9 is a flowchart showing a process performed in interpolation error measurement.

In the beginning, at the start of the interpolation error measurement process, the rotating moving shaft 20 is rotated by an infinitesimal angle (step S42). In this example, rotating moving shaft 20 is rotated by a smallest unit of angle which the rotating moving shaft 20 can be rotated. The infinitesimal angle by which rotation is made in the step S42 is not limited to the smallest unit of angle, but it can be any angle as long as the angle is smaller than an interpolation error cycle, that is, the rotation angle per tooth (rotational pitch) for a gear provided on the rotating moving shaft 20. It is preferable that the infinitesimal angle be an angle smaller than or equal to one fourth of the interpolation error cycle.

In like manner with the processing conducted from the step S18 to the step S30 in FIGS. 7 and 8, processing in the step S44 through the step S54 is performed. Specifically, after the rotating moving shaft 20 comes to a stop, the rotation angle θ1 of the encoder shaft 22 and the rotation angle θ2 of the encoder body 26 are calculated based on the rotation angle data and the data on the optical path length difference received from the rotary encoder 12 and the laser interferometric unit 40, respectively. After that, the rotation angle θ1 of the encoder shaft 22 is corrected depending on the size of the rotation angle θ2 of the encoder body 26 (steps S44 to S56). In the same manner as the embodiment described above, correction can be made to the rotation angle θ1 of the encoder shaft 22 based on the rotation angle θ2 of the encoder body 26 regardless of the size of the rotation angle θ2 of the encoder body 26.

Next, it is determined that whether or not the interpolation error measurement is complete (step S58). In this example, to determine whether or not the interpolation error measurement is complete, it is determined that whether or not the rotation range from the start position of the interpolation error measurement (measurement point) to the current position has exceeded a specified threshold. The threshold (angle range) as a reference for determination is equal to or greater than the interpolation error cycle subject to detection. It takes much time to measure interpolation errors if the set threshold is too large. Thus, it is preferable that it should be set to a proper range depending on the interpolation error cycle.

If it is determined that the interpolation error measurement has not been finished, the process goes back to the step S42 to let the rotating moving shaft 20 rotate by an infinitesimal angle and then repeats the step S44 and the subsequent steps. On the other hand, if it is determined that the interpolation error measurement has been finished, the process goes back to the step S32 of FIG. 8.

Figure 10:
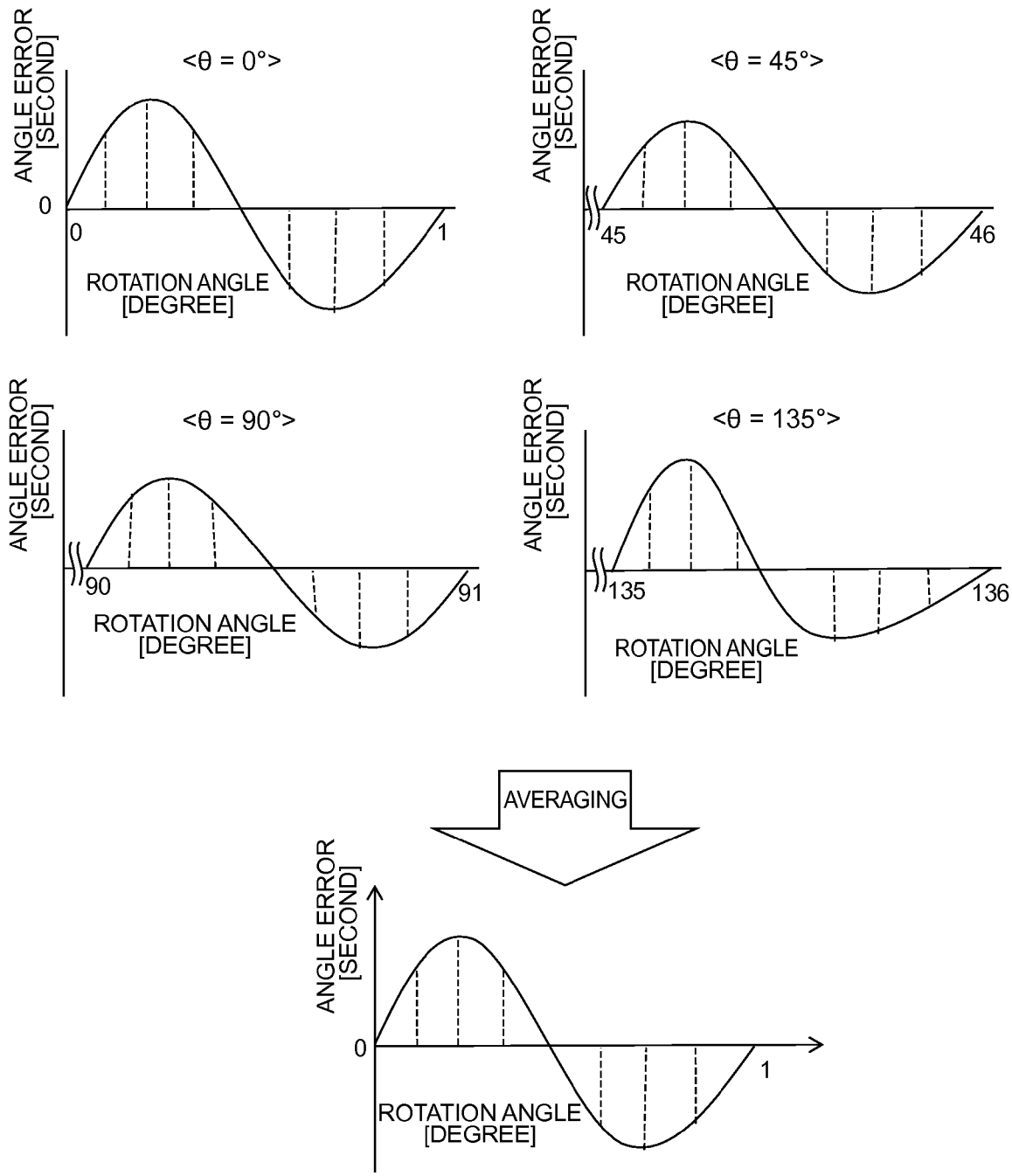
FIG. 10 is a schematic diagram showing a state where interpolation error correction data is prepared from an interpolation error obtained at each measurement point.

In the step S32 of FIG. 8, the processing in the step S18 through the step S40 is repeated until measurement is conducted at every measurement point each specified number of times (step S32). This provides interpolation errors measured at each measurement point, for example, shown in the upper row of FIG. 10. FIG. 10 shows, as one example, interpolation errors measured at the vicinities of a plurality of measurement points (0 degree, 45 degrees, 90 degrees, 135 degrees) set at 45-degree intervals.

Next, in like manner with the first embodiment, the correction data generating unit 70 calculates an error between the rotation angle (set angle) and the index angle (corrected rotation angle θ1' calculated in the step S30 or rotation angle θ1 before correction) at each measurement point to generate correction data which represents a correction amount for the rotation angle so that the error is canceled (step S34).

At that time, the correction data generating unit 70 generates correction data so as to cancel the interpolation error based on the interpolation error acquired at each measurement point. Specifically, as shown in the lower row of FIG. 10, it reflects, for example, the mean value of interpolation errors acquired at each measurement point as an interpolation error correction value in the correction data in every interpolation error cycle.

Lastly, the correction data is output to the control device 90 of the machine tool or the output device 74 (step S36).

The second embodiment as described above enables interpolation errors arising from a gear provided on the rotating moving shaft 20 to be measured with improved accuracy without being affected by influences of an eccentric error caused by axis misalignment, even if the encoder shaft 22 is coupled to the rotating moving shaft 20 with the axes misaligned. This enables the generation of correction data for correcting interpolation errors. Correcting the rotation angle of the rotating moving shaft 20 using the correction data provides improved accuracy in indexing the rotation angle of the rotating moving shaft 20 without being affected by influences of interpolation errors. This also enables easy installation of the rotary encoder 12.

In the second embodiment, all the measurement points set in the step S14 are subject to interpolation error measurement. Interpolation error measurement, however, may be performed on some instead of all the measurement points.

Third Embodiment of Invention

A third embodiment according to the present invention will now be described. Descriptions of elements that are shared with the above-mentioned embodiments are omitted and only elements characterized by the third embodiment will be mainly described.

In contrast to the first and the second embodiments of the present invention, in which rotation angles are statically measured (static measurement) after the rotating moving shaft 20 comes to a stop, the third embodiment of the present invention uses dynamic measurement (dynamic measurement) to detect rotation angles at predetermined time intervals while letting the rotating moving shaft 20 rotate at a constant rotation speed.

Figure 11:
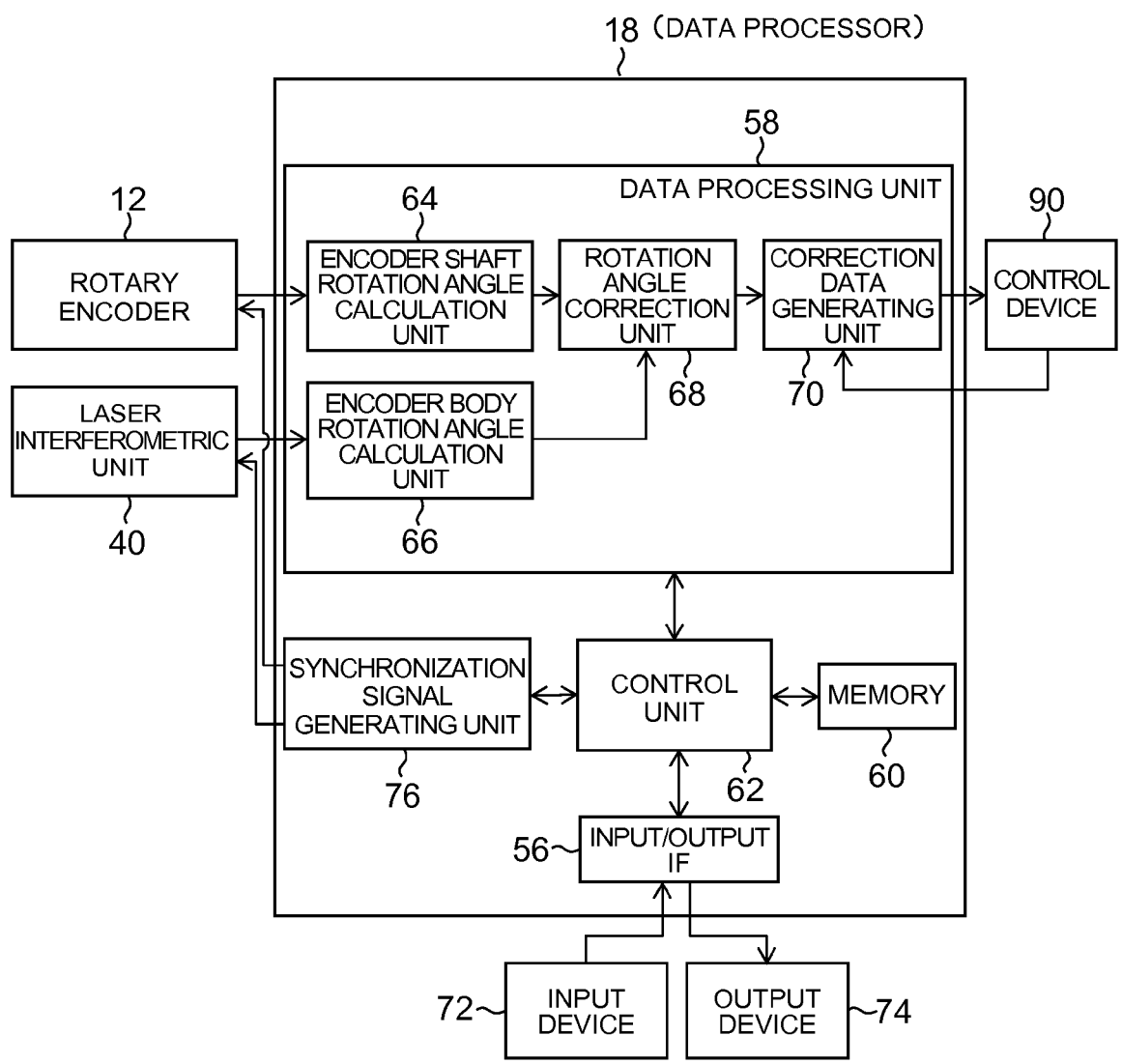
FIG. 11 is a block diagram illustrating a functional configuration of a data processor according to a third embodiment of the present invention.

FIG. 11 is a block diagram illustrating a functional configuration of a data processor 18 according to the third embodiment of the present invention. In FIG. 11, structural elements identical to those of FIG. 5 are assigned with the same reference numerals, and their descriptions are omitted.

With reference to FIG. 11, the data processor 18 includes a synchronization signal generating unit 76 that generates synchronization signals. The number of occurrences and intervals at which the synchronization signal generating unit 76 generates synchronization signals are controlled by a control unit 60. Synchronization signals generated by the synchronization signal generating unit 76 are output to a rotary encoder 12 and a laser interferometric unit 40.

Figure 12:
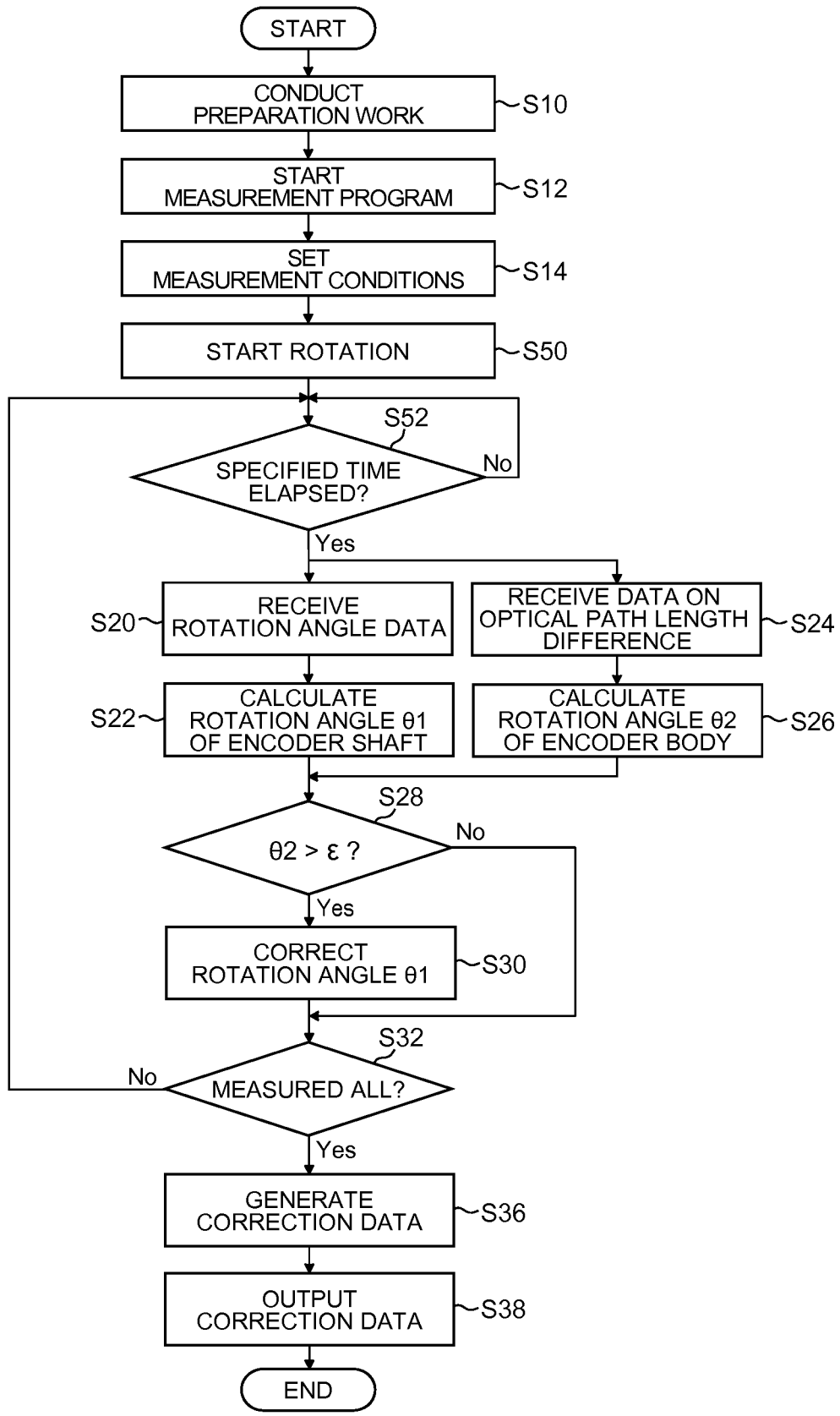
FIG. 12 is a flowchart showing an example of processes of a method for measuring rotation according to the third embodiment of the present invention.
Figure 13:
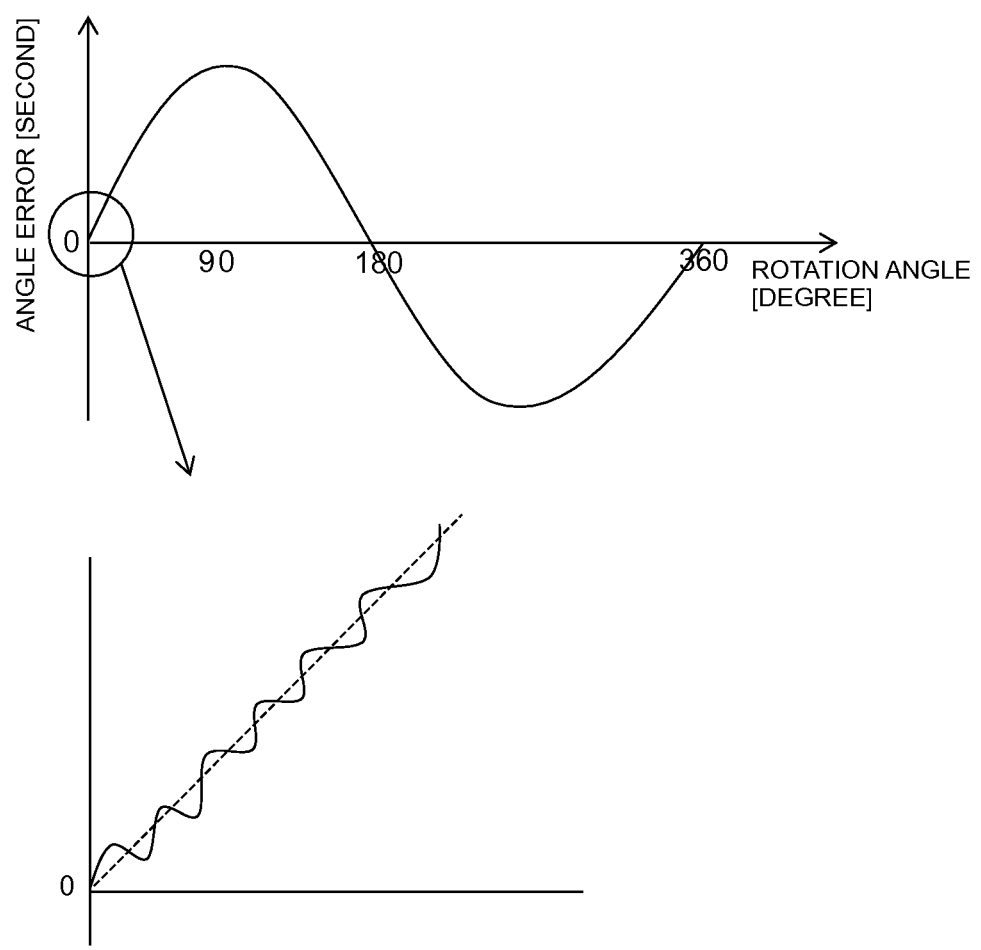
FIG. 13 illustrates a condition where angle errors are included in rotation angle data output from a rotary encoder.

FIG. 12 is a flowchart showing a method for measuring rotation angles according to the third embodiment of the present invention. In FIG. 12, steps identical to those of FIG. 7 or 8 are assigned with the same reference numerals, and their descriptions are omitted.

With reference to FIG. 12, the rotating moving shaft 20 is rotated up to a position where measurement starts (step S16), and then the rotating moving shaft 20 starts rotating (step S50). At this time, let the rotating moving shaft 20 rotate at a constant rotation speed. Also, the synchronization signal generating unit 76 outputs synchronization signals to the rotary encoder 12 and the laser interferometric unit 40. The synchronization signal generating unit 76 generates a synchronization signal which indicates detection timing at each of the predetermined time intervals.

Next, the rotary encoder 12 and the laser interferometric unit 40 are kept on standby until a specified time according to the synchronization signal output from the synchronization signal generating unit 76 elapses (step S52), and then detect an rotation angle and an optical path length difference with the same timing, respectively, so as to output data on the rotation angle data and data on the optical path length difference.

Processing in the step S20 through the step S30 is similar to that of the embodiments described above. The encoder shaft rotation angle calculation unit 64 and the encoder body rotation angle calculation unit 66 receive rotation angle data and data on the optical path length difference output from the rotary encoder 12 and the laser interferometric unit 40 at each of measurement time intervals, and calculate the rotation angle θ1 of the encoder shaft 22 and the rotation angle θ2 of the encoder body 26 based on the received rotation angle data and data on the optical path length difference. Then, the rotation angle correction unit 68 corrects or does not correct the rotation angle θ1 of the encoder shaft 22 depending on the size of the rotation angle θ2 of the encoder body 26. In the same manner as the embodiment described above, correction can be made to the rotation angle θ1 of the encoder shaft 22 based on the rotation angle θ2 of the encoder body 26 regardless of the size of the rotation angle θ2 of the encoder body 26.

Next, it is determined that whether or not the measurement has been entirely performed (step S32). In this example, the system determines whether or not the rotating moving shaft 20 has been traveled to the measurement end position. If the rotating moving shaft 20 has not been traveled to the measurement end position, the processing in the step S20 through the step S28 is repeated. When the rotating moving shaft 20 has been traveled to the measurement end position, the process advances to the next step S36.

Processing for generating correction data in the step S36 is similar to that of the embodiments described above. The correction data generating unit calculates an error between the rotation angle (set angle) and the index angle, which are measured at each point, and generates correction data which represents a correction amount for the rotation angle so as to cancel the error (step S36). Then, the correction data generated in the step S36 is output to the control device 90 of the machine tool or the output device 74 (step S38).

The third embodiment as described above uses dynamic measurement (dynamic measurement) through which the rotary encoder 12 and the laser interferometric unit 40 detect an rotation angle and an optical path length difference with the same timing, respectively, at each of predetermined time intervals according to synchronization signals output from the synchronization signal generating unit 76, while letting the rotating moving shaft 20 rotate at a constant rotation speed. This enables rotation angles to be measured continuously over a measurement range and thus locally occurring angle errors to be reliably detected. This provides improved accuracy in indexing the rotation angle of the rotating moving shaft 20.

Fourth Embodiment of Invention

A fourth embodiment according to the present invention will now be described. Descriptions of elements that are shared with the above-mentioned embodiments are omitted and only elements characterized by the fourth embodiment will be mainly described.

Figure 14:
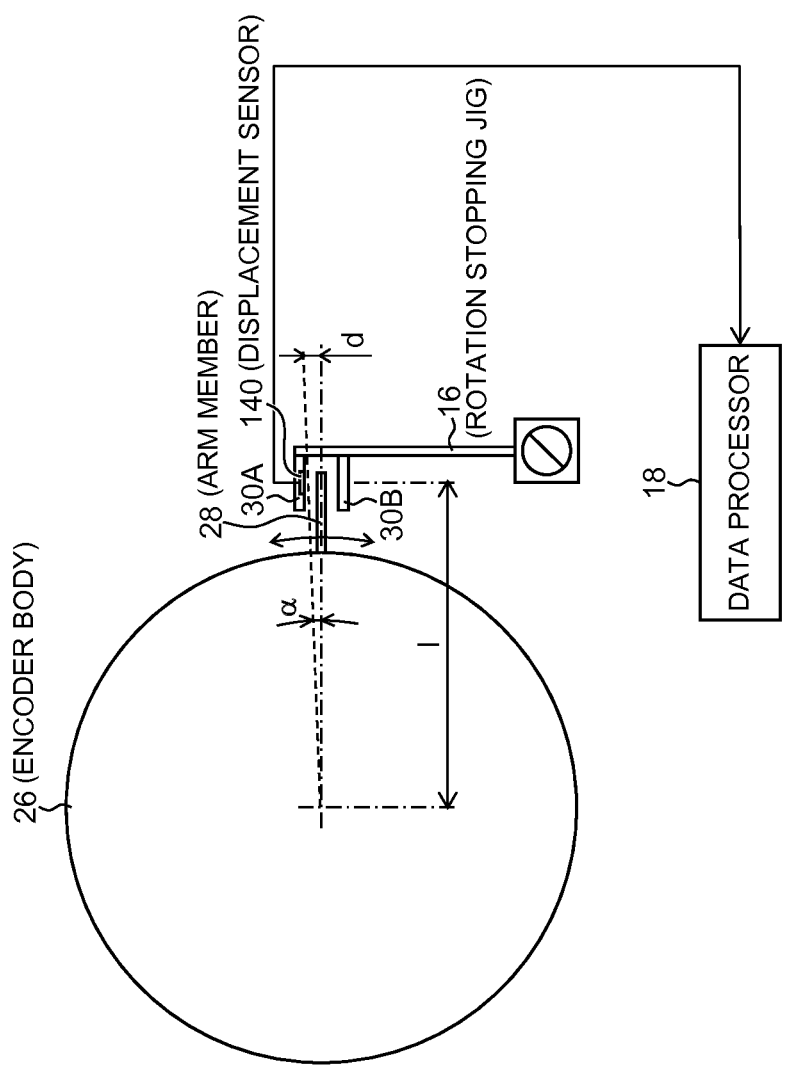
FIG. 14 is a configuration diagram illustrating a configuration example of the end portion of a rotation stopping jig according to a fourth embodiment of the present invention.

FIG. 14 illustrates a configuration example of the end portion of a rotation stopping jig according to the fourth embodiment of the present invention. In FIG. 14, structural elements identical to those of FIG. 3 are assigned with the same reference numerals, and their descriptions are omitted.

With reference to FIG. 14, a displacement sensor 140 for detecting the displacement of an arm member 28 is provided on a rotation regulating member 38A or 38B placed at the end of a rotation stopping jig 16. Upon detecting the displacement of the arm member 28, the displacement sensor 140 outputs the detection result to a data processor 18.

The displacement sensor 140 can be applied to any one of various publicly known sensors capable of detecting the displacement of the arm member 28, including electrostatic capacitive type, eddy-current type, optical type (triangular range-finding type, reflected light amount type), laser type, and contact type (differential transformer type, plunger type, strain gauge type), for example. Alternatively, an optical scale may be used to detect the displacement of the arm member 28. Descriptions of these types are omitted because publicly known configurations can be applied.

Figure 15:
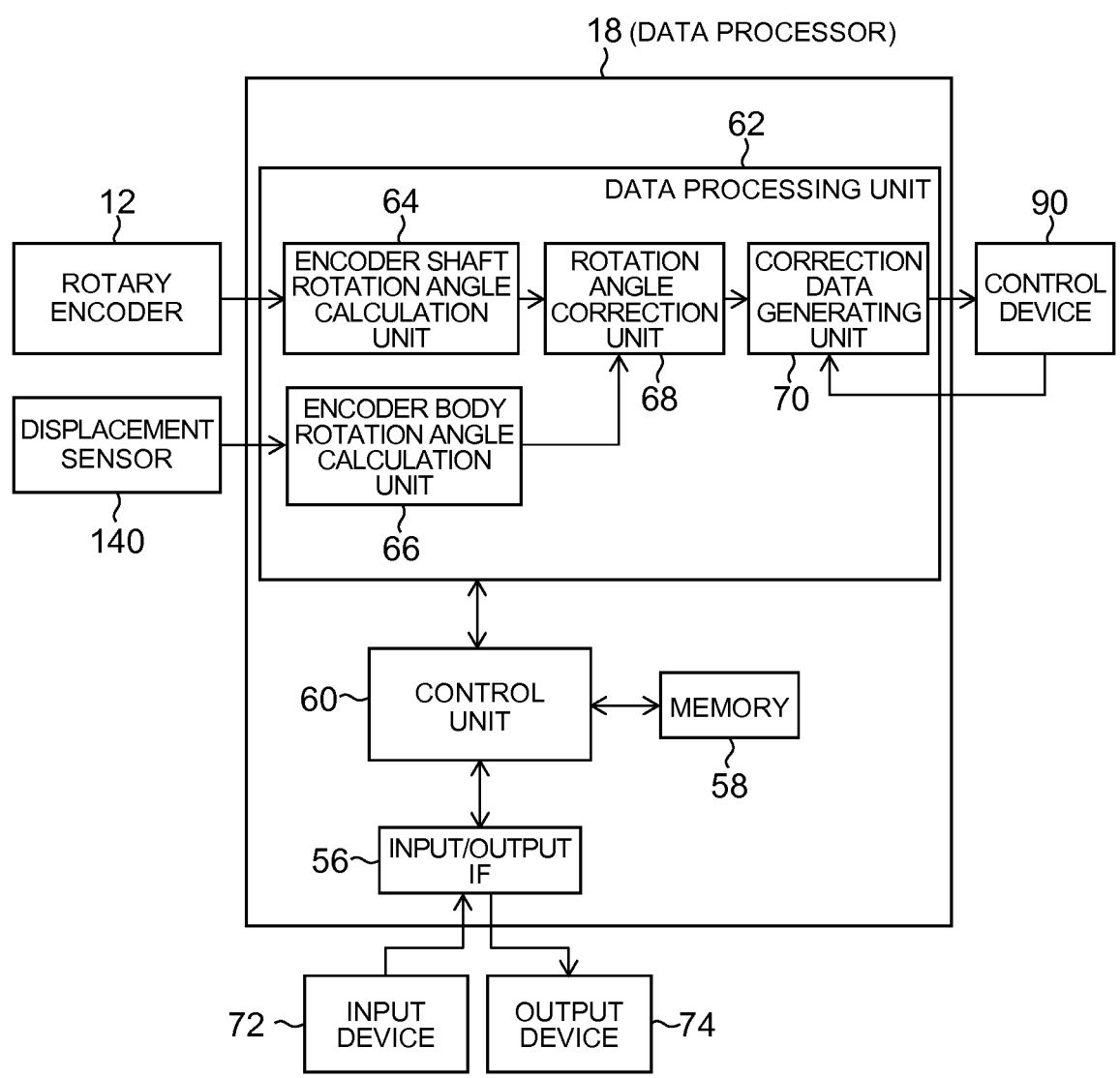
FIG. 15 is a block diagram illustrating a configuration of a data processor according to the fourth embodiment of the present invention.

FIG. 15 is a block diagram illustrating a configuration of a data processor according to the fourth embodiment of the present invention. In FIG. 15, structural elements identical to those of FIG. 5 are assigned with the same reference numerals, and their descriptions are omitted.

With reference to FIG. 15, the displacement of the arm member 28 detected by the displacement sensor 140 is fed into an encoder body rotation angle calculation unit 66. The encoder body rotation angle calculation unit 66 calculates the rotation angle of an encoder body 26 based on the displacement of the arm member 28 detected by the displacement sensor 140.

Here the rotation angle α of the encoder body 26 can be determined by the following equation, $\alpha = \sin^{-1}(d/l)$, where α is the rotation angle of the encoder body 26; d is the displacement of the arm member 28; and l is the distance from the center of rotation of the encoder body 26 to the end portion (displacement measurement position) of the arm member 28. Other processing is carried out in like manner with the embodiments described above.

The fourth embodiment described above includes the displacement sensor 140 that detects the displacement of the arm member 28 of the encoder body 26. Thus, the rotation angle of the encoder body 26 can be determined with the displacement of the arm member 28 detected by the displacement sensor 140. Accordingly, even when an inertial force associated with the start or stop of rotation of the rotating moving shaft 20 causes the encoder body 26 to rotate together with the rotating encoder shaft 22, the simpler configuration compared to those of the above-described embodiments enables a rotation angle detected by the rotary encoder 12 to be corrected based on the rotation angle of the encoder body 26 and thus influences owing to an initial offset error to be canceled. This provides improved accuracy in indexing the rotation angle of the rotating moving shaft 20.

In the embodiments described above, no limitation is imposed on the method of output by the rotary encoder 12. The method may be an incremental system which provides outputting a pulse signal (relative angle signal) according to the amount of rotational displacement (rotation angle) from the measurement start position or may be an absolute system which provides outputting a code signal (absolute angle signal) corresponding to the angle position with respect to the reference point.

No limitation is imposed on the method of detection by the rotary encoder 12. Various methods such as optical system, magnetic system, laser system, mechanical system, optical fiber system and electrostatic capacitive system can be adopted.

The rotary encoder 12 may include a coupling member for mechanically coupling the encoder shaft 22 and the rotating moving shaft 20. It is preferable that the coupling member be a flexible coupling capable of absorbing an axis misalignment between the rotating moving shaft 20 and the rotating moving shaft 20. At that time, it is necessary to select a flexible coupling for use according to the measurement accuracy because the amount of eccentricity that can be absorbed varies with the flexible coupling type.

Moreover, the application of the present invention is not limited to the configuration which includes the rotary encoder 12 as relative angle detection means, which is shown as an example in each of the above-described embodiments. For example, an angle sensor by the use of a resolver may be employed. Description of the angle sensor by the use of a resolver is omitted here because the application is publicly known.

The rotation angle measurement device and the rotation angle measurement method according to the present invention are described in detail above. However, the application of the present invention is not limited to these examples. It should be understood that various modifications and alterations may occur insofar as they are within the scope of the present invention.

Lastly, one of the challenges of the present invention is to detect the rotation angle of a rotating body in real time with improved accuracy. The following preconditions need to be satisfied to detect the rotation angle of a rotating body with improved accuracy. If even one of the steps for detection is missing, it signifies nothing as a whole.

Detecting the rotation angle of a rotating body from outside the rotating body does not produce any accurate measurement. This is because the rotating body undergoes infinitesimal displacement of the whole rotating system and oscillation of the rotating system, which are associated with rotation. Thus, detecting a change from outside the rotating body cannot distinguish an angle change caused by real rotation from one resulting from the infinitesimal displacement or oscillation.

For example, in the case of a method of detecting rotation angles with laser beams, the rotation of an object subject to measurement of the rotation angle by applying laser beams is not restrained and measurement is performed on the rotating body from a position apart from the shaft or the bearing part of the rotating body. As a result, the oscillation and infinitesimal parallel displacement of the rotating body itself and other errors caused by moves other than rotation are assumed as rotation in some cases. Thus, a mechanism for detection by irradiating a rotating body with beams from a position outside the rotating system does not constitute a mechanism for detecting rotation angles with high accuracy in a meaningful manner.

Accordingly, in measuring rotation angles in a rotating system, it is of the first importance to ensure that a supporting body as a reference (reference support) belongs to a rotating system shared with the rotating body. In other words, rotation angles should be measured in a state where the rotating body is axially supported, that is, connected with the shaft and the bearing, by the reference support. Since the reference support and the rotating body are in an identical rotating system when rotation is measured with the same axis connecting them, that is, when the rotation angle is detected with them belonging to the identical rotating system, oscillation and displacement of the rotating system associated with the rotation of the rotating body are canceled. This enables rotation angles alone to be measured with relatively improved accuracy.

Furthermore, in determining the rotation angle of a rotating body, codes (encodes) need to be successively marked at equal infinitesimal pitches at regular intervals. Pulses emitted from equally pitched codes allow respective rotation angles to be read. For example, some encoders have codes marked at some 20 μm pitches on the perimeter corresponding to a diameter of 50 mm. The codes need to be marked on the entire perimeter.

Marking codes on the entire perimeter at equal infinitesimal pitches at regular intervals produces successive and uniformly spaced pulses. Thus, turning the encoder one revolution allows correction (calibration) to be performed even if the encoder is misaligned in some degree. In other words, even if the encoder is secured with its axis misaligned, the amount of displacement of the angle returns to the original level like tracing a sine curve after the encoder rotates one revolution. Thus, uniformly spaced and successively infinitesimal pulses enable rotation angles to be properly corrected.

Also, when the encode is formed into a disk shape or a ring shape on the entire perimeter, no shearing thermal stress is exerted inside the encoder even if there is the influence of frictional heat in the vicinity of the shaft. This is because heat is generated between the shaft and the bearing and thus distributed circularly symmetric to the shaft in a radial direction. In other words, when the encoder becomes deformed by thermal stress, it can keep angular degrees as-is in a circumferential direction without being affected by the Poisson's ratio.

On the other hand, measurement in a same rotating system does not always provide sufficient accuracy in detection. This is because, in the case of measurement in a rotating body, forces such as a frictional force generated between the shaft and the bearing in no small quantities and an inertial force generated by a sudden start or a sudden stop of rotation are applied to the rotation restrained part. In a system where such forces are applied, a reference part which is a rotation reference is inevitably displaced by a frictional force, an inertial force and the like. Thus, the detection of how much the rotation reference position has been shifted in angle is necessary.

This cannot be measured in a same rotating system because a frictional force or an inertial force inevitably acts on the same rotating system.

For example, when the rotation angle of a rotating body is detected using a level, the level needs to be installed in the same rotating system. In such a case, the level is subject to a frictional force and an inertial force from the rotating body. For example, when the rotating body is abruptly driven to rotate or stop, the level is directly affected by the frictional force and the inertial force.

As a result, it is impossible to detect an angle in real time and instantly. This is because the level is affected by a frictional force and an inertial force in varying degrees when it is on contact with a rotating body to make a measurement. Moreover, the level does not instantly detect a position but defines a level by gravity with respect to a stationary part. In other words, a position is determined by balance in a dynamical system under the action of gravity only. In such a case, it is self-evident that setting a reference by gravity in a system under the action of a frictional force and an inertial force associated with the rotation of a rotating body does not provide the real-time, i.e. instant detection of angles.

A level, with the assumption that it is unable to detect an angle in real time and instantly, cannot detect an angle accurately even if not in real time.

This is because the rotating body needs to be rotated backward so as to return the level to an ideal level position when the level is stopped at a position other than the ideal level position under the action of a frictional force and an inertial force caused by the rotation of the rotating body. In a strict sense, there is a difference between the amount of displacement in angle by a normal rotation and the amount of return in angle by a reverse rotation for correction. This is because the gear for driving the rotating body produces effects. The effect of a backlash of the gear and the influence of an interpolation error generated by the engagement of each tooth of the gear cause a rotation angle to vary infinitesimally between the forward and reverse directions. Because of this, under a method like a level that determines positions by balance in gravity, the challenge of instantly detecting an angle and the object of detecting an angle with sufficient accuracy according to the present invention cannot be possibly achieved because the method requires a procedure of turning backward (backtracking).

While the present invention allows a rotation axis in any given direction to be taken, levels cannot be provided for that. For example, in the case of the rotation axis being in a vertical direction, the level does not even operate because of no gravity action. Thus, the level is essentially inconsistent with the present invention in terms of a disadvantage to be solved.

Hence, in order to correctly detect rotation angles in an identical rotating system, the rotating body needs to be axially supported by the same rotating system at first so as to accurately make a measurement by canceling the displacement and the oscillation of the whole rotating system.

Frictional force between the shaft and the bearing, inertial force and other force, however, are applied when measurement is performed in a same rotating system. For this reason, it is advisable to measure a displacement in the rotation (rotation displacement) with respect to the reference support, which is a rotation reference, on a non-contact basis from a position that does not contact with the rotating system. Doing so enables a rotational displacement to be measured with improved accuracy in a non-contact manner without being affected by the rotational motion.

Means for relatively measuring rotation angles, which is axially supported by being embedded in a rotating system and means for measuring rotation angles on a non-contact basis from a position that does not contact the rotating system are capable of independently conducting a measurement based on respective references independent of each other. Thus, their measurement results do not interfere each other.

Also, in combining measurement results each other, there is no room for extraneous structural disturbance factors such as a need for rotating backward and a need for mechanically fitting in.

Accordingly, this enables rotation angles by the rotational motion to be comprehensively detected and then measured with improved accuracy and in a simple manner.

As described above, a person skilled in the art could not have easily arrived at a configuration of the present invention. That is, the configuration comprises: relative angle detection means including a reference support whose rotation is regulated in a fixed (predetermined) range in an arbitrary direction of a rotation axis, and a driving rotating body which is coupled to the reference support and is axially supported so as to be all-round rotatable with respect to the reference support, the relative angle detection means for detecting a relative rotation angle of the rotating body with respect to the reference support; and non-contact angle detection means for detecting a rotation angle of the reference support with respect to a position that does not contact with the rotating body and the reference support.

REFERENCE SIGNS LIST

10 . . . rotation angle measurement device, 12 . . . rotary encoder, 16 . . . rotation stopping jig, 18 . . . data processor, 20 . . . rotating moving shaft, 22 . . . encoder shaft, 23 . . . large diameter part, 24 . . . bearing, 26 . . . encoder body, 28 . . . arm member, 34 . . . scale plate, 36 . . . read head, 40 . . . laser interferometric unit, 44 . . . optical head, 46 . . . photodetector, 50 . . . laser light source, 52 . . . polarization beam splitter, 54 . . . right-angle prism, 56 . . . input/output IF, 58 . . . memory, 60 . . . control unit, 62 . . . data processing unit, 64 . . . encoder shaft rotation angle calculation unit 66 . . . encoder body rotation angle calculation unit, 68 . . . rotation angle correction unit, 70 . . . correction data generating unit, 72 . . . input device, 74 . . . output device, 76 . . . synchronization signal generating unit, 140 . . . displacement sensor

The invention claimed is:

1. A rotation angle measurement device comprising:
 a rotary encoder which detects a relative rotation angle between a reference support whose rotation is set within a fixed range, and a driving rotating body which is axially supported so as to be all-around rotatable with respect to the reference support; and
 a laser interferometric detecting device which optically detects a rotation angle of the reference support associated with rotation of the driving rotating body in a non-contact manner at a position that is separated from the driving rotating body and the reference support.

2. The rotation angle measurement device according to claim 1, further comprising:
 a processor; and
 memory storing computer readable instructions that, when executed, cause the rotation angle measurement device to correct the rotation angle detected by the rotary encoder based on the rotation angle detected by the laser interferometric detecting device.

3. The rotation angle measurement device according to claim 1, wherein the rotary encoder detects the relative rotation angle of the driving rotating body every rotation angle smaller than a cycle of occurrence of a periodic error which periodically occurs in association with the rotation of the driving rotating body.

4. The rotation angle measurement device according to claim 1, wherein the laser interferometric detecting device detects the rotation angle of the reference support concurrently with the detection of the relative rotation angle by the rotary encoder.

5. The rotation angle measurement device according to claim 1, wherein the rotary encoder is a rotary encoder.

6. The rotation angle measurement device according to claim 1, wherein the laser interferometric detecting device uses laser interference.

7. A rotation angle measurement method comprising:
a relative angle detection step for detecting, using a rotary encoder having a reference support and a rotating body, a relative rotation angle between the reference support whose rotation is set within a fixed range, and the rotating body which is axially supported so as to be all-around rotatable with respect to the reference support; and
an optical angle detection step for optically detecting, using a laser interferometric detecting device, a rotation angle of the reference support associated with the rotation of the rotating body in a non-contact manner at a position that is separated from the rotating body and the reference support.

8. The rotation angle measurement method according to claim 7, further comprising:
a correction step for correcting the rotation angle detected by the relative angle detection step based on the rotation angle detected by the optical angle detection step.

9. The rotation angle measurement method according to claim 7, wherein the relative angle detection step detects the relative rotation angle of the rotating body every rotation angle smaller than a cycle of occurrence of a periodic error which periodically occurs associated with the rotation of the rotating body.

10. The rotation angle measurement method according to claim 7, wherein the optical angle detection step detects the rotation angle of the reference support concurrently with the detection of the relative rotation angle by the relative angle detection step.

11. A rotation angle measurement device comprising:
a relative angle detection unit which detects a relative rotation angle between a reference support whose rotation is set within a fixed range, and a driving rotating body which is axially supported so as to be all-round rotatable with respect to the reference support; and
an optical angle detection unit which optically detects a rotation angle of the reference support associated with rotation of the driving rotating body in a non-contact manner at a position that is separated from the driving rotating body and the reference support.

12. The rotation angle measurement device according to claim 11, further comprising:
a correction unit which corrects the rotation angle detected by the relative angle detection unit based on the rotation angle detected by the optical angle detection unit.

13. The rotation angle measurement device according to claim 11, wherein the relative angle detection unit detects the relative rotation angle of the driving rotating body every rotation angle smaller than a cycle of occurrence of a periodic error which periodically occurs in association with the rotation of the driving rotating body.

14. The rotation angle measurement device according to claim 11, wherein the optical angle detection unit detects the rotation angle of the reference support concurrently with the detection of the relative rotation angle by the relative angle detection unit.

15. The rotation angle measurement device according to claim 11, wherein the relative angle detection unit is a rotary encoder.

16. The rotation angle measurement device according to claim 11, wherein the optical angle detection unit uses laser interference.

* * * * *